US012437684B2

(12) United States Patent
Lin et al.

(10) Patent No.: US 12,437,684 B2
(45) Date of Patent: Oct. 7, 2025

(54) DISPLAY PANEL AND DISPLAY DEVICE

(71) Applicant: Xiamen Tianma Microelectronics Co., Ltd., Xiamen (CN)

(72) Inventors: Yiqiang Lin, Xiamen (CN); Zonghua Qiao, Xiamen (CN)

(73) Assignee: Xiamen Tianma Microelectronics Co., Ltd., Xiamen (CN)

( * ) Notice: Subject to any disclaimer, the term of this patent is extended or adjusted under 35 U.S.C. 154(b) by 128 days.

(21) Appl. No.: 18/383,498

(22) Filed: Oct. 25, 2023

(65) Prior Publication Data

US 2024/0062690 A1 Feb. 22, 2024

(30) Foreign Application Priority Data

Jun. 27, 2023 (CN) ......................... 202310769412.0

(51) Int. Cl.
*G09G 3/00* (2006.01)

(52) U.S. Cl.
CPC ..... *G09G 3/006* (2013.01); *G09G 2300/0426* (2013.01); *G09G 2310/0297* (2013.01)

(58) Field of Classification Search
CPC ........... G09G 3/006; G09G 2300/0426; G09G 2310/0297; G09G 3/20; G09F 9/00; H01L 27/12
See application file for complete search history.

(56) References Cited

U.S. PATENT DOCUMENTS

| | | | | |
|---|---|---|---|---|
| 2018/0197456 A1* | 7/2018 | Xing | ...................... | H10D 86/40 |
| 2021/0134839 A1* | 5/2021 | Nakayama | ................ | G09F 9/30 |
| 2022/0328396 A1* | 10/2022 | Guo | ...................... | G11C 11/221 |

FOREIGN PATENT DOCUMENTS

| | | |
|---|---|---|
| CN | 206134140 | 4/2017 |
| CN | 113113385 A | 7/2021 |
| CN | 115035873 A | 9/2022 |

* cited by examiner

*Primary Examiner* — Michael A Faragalla
(74) *Attorney, Agent, or Firm* — KDW FIRM PLLC

(57) ABSTRACT

Provided are a display panel and a display device, which relate to the field of display technology. The display panel includes a source line and a signal line group including a first signal line group, the first signal line group includes a first signal line and a second signal line. The first signal line includes a first line segment and a second line segment which are coupled. The second signal line includes a third line segment and a fourth line segment which are coupled. Along the first direction, a distance between the first line segment and a source line is less than or equal to a distance between the third line segment and the source line, and a distance between the second line segment and the source line is greater than or equal to a distance between the fourth line segment and the source line.

19 Claims, 15 Drawing Sheets

DISPLAY PANEL AND DISPLAY DEVICE

CROSS-REFERENCE TO RELATED APPLICATION

This application claims priority to Chinese patent application No. 202310769412.0 filed with the CNIPA on Jun. 27, 2023, the disclosure of which is incorporated herein by reference in its entirety.

TECHNICAL FIELD

The present disclosure relates to the field of display technology and, in particular, to a display panel and a display device.

BACKGROUND

For related display panels, a display panel may include a display region and a non-display region. Data lines which can control pixel units to display images are disposed in the display region, and a driver chip and source lines (also referred to as fan-out leads) which are electrically connected to the driver chip are disposed in the non-display region; and various source lines can provide display signals for the preceding data lines.

In the non-display region of the display panel, in addition to fan-out leads, other signal lines may further be disposed. However, pulse signals transmitted by other signal lines will be coupled to the source lines, affecting the display effect of the display panel.

SUMMARY

Embodiments of the present disclosure provide a display penal so as to reduce the coupling effect of a first signal line group on a source line and improve the display effect of the display panel.

Embodiments of the present disclosure provide a display panel. The display panel includes a display region and a non-display region, and the non-display region is located on the periphery of the display region.

The display panel includes a substrate, a source line which is located in the non-display region and a signal line group. The signal line group is located in the non-display region and is located on the same side of the substrate as the source line, the signal line group includes a first signal line group, the first signal line group is located on a side of the source line along a first direction, where the first direction is parallel to a plane where the substrate is located; the first signal line group includes a first signal line and a second signal line, and the first signal line and the second signal line transmit pulse signals which have opposite polarities.

The first signal line includes a first line segment and a second line segment which are coupled, and the second signal line includes a third line segment and a fourth line segment which are coupled.

Along the first direction, a distance between the first line segment and the source line is less than or equal to a distance between the third line segment and the source line.

Along the first direction, a distance between the second line segment and the source line is greater than or equal to a distance between the fourth line segment and the source line.

Embodiments of the present disclosure further provide a display device. The display device includes the display panel described in the first aspect.

According to the display panel provided in embodiments of the present disclosure, a position of the first line segment and a position of the second line segment in the first signal line are adjusted, and a position of the third line segment and a position of the fourth line segment in the second signal line are adjusted, so that the first signal line and the second signal line which transmit pulse signals having opposite polarities have similar coupling effects on the source line, and thus the overall coupling effect of the first signal line group on the source line is reduced; therefore, the phenomenon of white vertical lines in the display panel is reduced, and the display effect of the display panel is improved.

DETAILED DESCRIPTION

To make the objects, solutions and advantages of the present disclosure clearer, the technical solutions of the present disclosure will be completely described below in conjunction with the specific embodiments and the drawings in the embodiments of the present disclosure. Apparently, the embodiments described herein are part, not all, of the embodiments of the present disclosure. Based on the embodiments of the present disclosure, all other embodiments obtained by those of ordinary skill in the art on the premise that no creative work is done are within the scope of the present disclosure.

Research has found that if a source line is relatively close to a signal line which transmits a positive polarity pulse signal, the potential of the source line will be pulled up; if a source line is relatively close to a signal line which transmits a negative polarity pulse signal, the potential of the source line will be pulled down. Thus, when the display panel displays images, the voltage on the source line is changed relative to a preset voltage due to the coupling effect on the source line, which can cause white vertical lines to appear in the middle or an edge region of the display region, affecting the display effect of the display panel.

Figure 1:
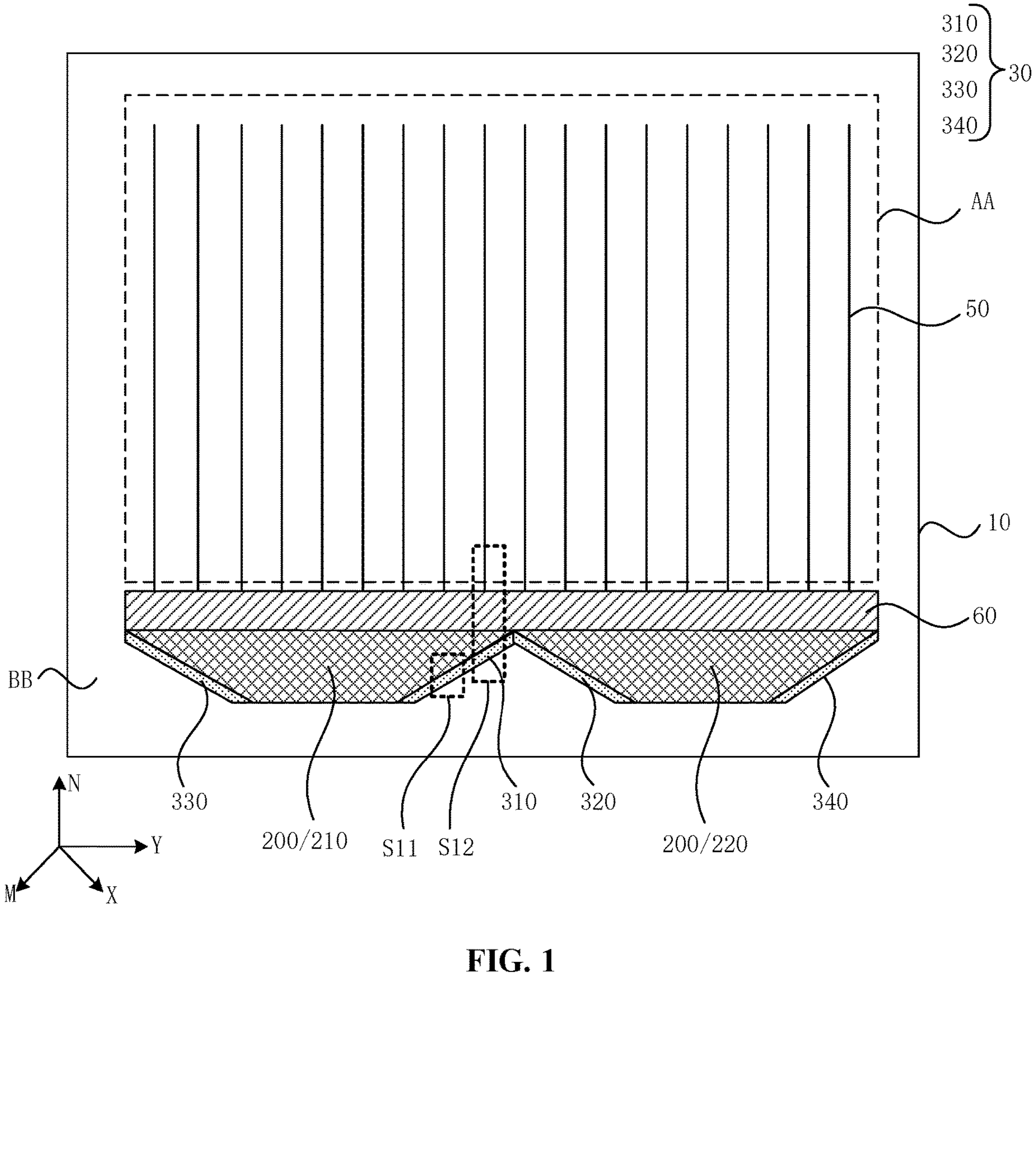
FIG. 1 is a top view of a display panel according to an embodiment of the present disclosure.
Figure 2:
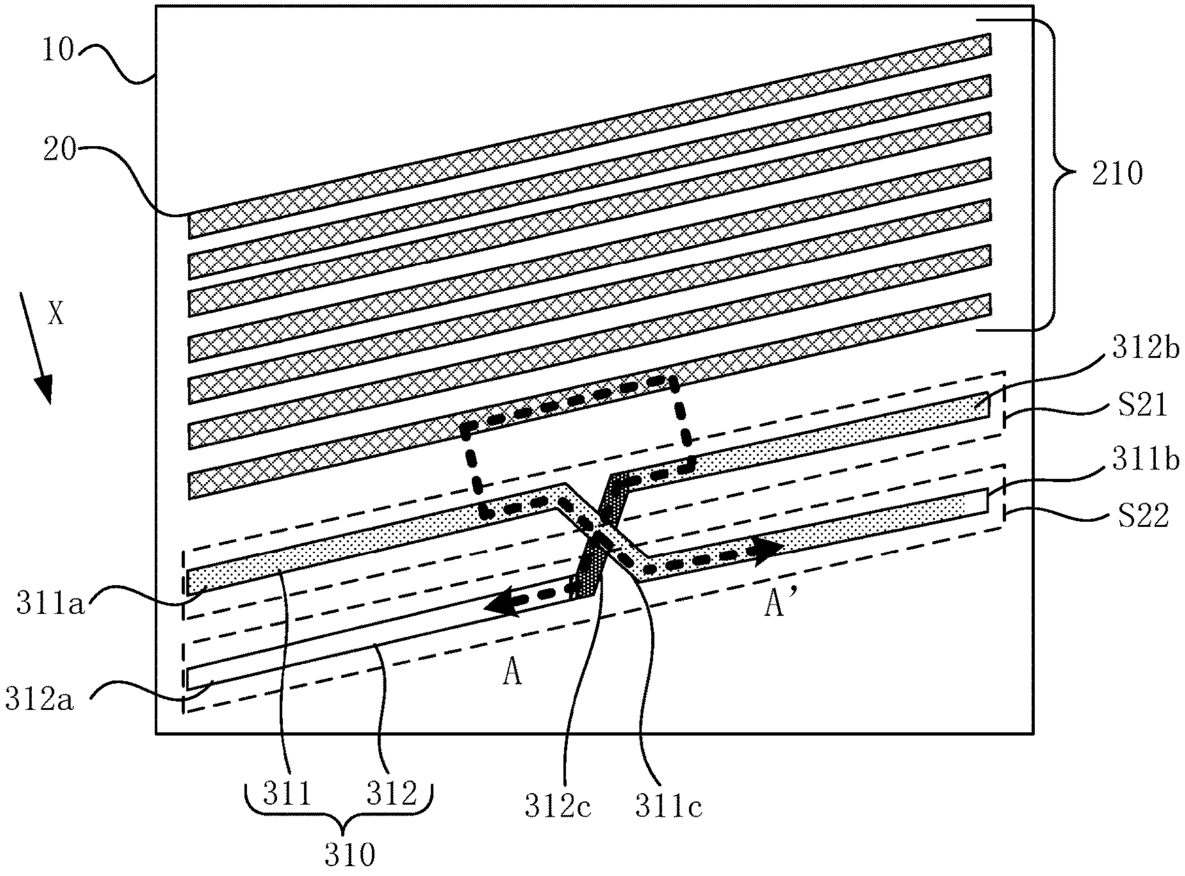
FIG. 2 is an enlarged view of region S11 in FIG. 1.

FIG. 1 is a top view of a display panel according to an embodiment of the present disclosure, and FIG. 2 is an enlarged view of region S11 in FIG. 1. Referring to FIGS. 1 and 2, the display panel provided in the embodiment of the present disclosure includes a display region AA and a non-display region BB, and the non-display region BB is located on the periphery of the display region AA. The display panel further includes a substrate 10, a source line 20 and a signal line group 30. The source line 20 is located in the non-display region BB, and the signal line group 30 is located in the non-display region BB. The signal line group 30 is located on the same side of the substrate 10 as the source line 20. The signal line group 30 includes a first signal line group 310. The first signal line group 310 is located on a side of the source line 20 along a first direction X. The first direction X is parallel to a plane where the substrate 10 is located. The first signal line group 310 includes a first signal line 311 and a second signal line 312. The first signal line 311 and the second signal line 312 transmit pulse signals which have opposite polarities. The first signal line 311 transmits a positive-polarity pulse signal, and the second signal line 312 transmits a negative-polarity pulse signal; or the first signal line 311 transmits a negative-polarity pulse signal, and the second signal line 312 transmits a positive-polarity pulse signal.

The first signal line 311 includes a first line segment 311*a* and a second line segment 311*b* which are coupled. The second signal line 312 includes a third line segment 312*a* and a fourth line segment 312*b* which are coupled. Along the first direction X, a distance between the first line segment 311*a* and a source line 20 is less than or equal to a distance between the third line segment 312*a* and the source line 20. Along the first direction X, a distance between the second line segment 311*b* and the source line 20 is greater than or equal to a distance between the fourth line segment 312*b* and the source line 20. A distance between a line segment (including the first line segment 311*a*, the second line segment 311*b*, the third line segment 312*a* and the fourth line segment 312*b*) and a source line 20 refers to a distance between the line segment and the closest source line 20, that is, a distance between the line segment and the outermost source line 20. Two components which are coupled may be directly or indirectly electrically connected.

An example where the first signal line 311 transmits a positive-polarity pulse signal and the second signal line 312 transmits a negative-polarity pulse signal is illustrated. The first signal line 311 transmits a positive-polarity pulse signal, that is, the first line segment 311*a* and the second line segment 311*b* transmit the positive-polarity pulse signal. The positive-polarity pulse signal transmitted by the first line segment 311*a* and the second line segment 311*b* will be coupled to the source line 20, so that the potential on the source line 20 is pulled up. The second signal line 312 transmits a negative-polarity pulse signal, that is, the third line segment 312*a* and the fourth line segment 312*b* transmit the negative-polarity pulse signal. The negative-polarity pulse signal transmitted by the third line segment 312*a* and the fourth line segment 312*b* will be coupled to the source line 20, so that the potential on the source line 20 is pulled down. Along the first direction X, the distance between the first line segment 311*a* and the source line 20 is less than or equal to the distance between the third line segment 312*a* and the source line 20. The coupling effect of the first line segment 311*a* on the source line 20 is greater than or equal to the coupling effect of the third line segment 312*a* on the source line 20. The combined coupling effect of the first line segment 311*a* and the third line segment 312*a* on the source line 20 tends to pull up the potential on the source line 20.

Along the first direction X, the distance between the second line segment 311*b* and the source line 20 is greater than or equal to the distance between the fourth line segment 312*b* and the source line 20. The coupling effect of the fourth line segment 312*b* on the source line 20 is greater than or equal to the coupling effect of the second line segment 311*b* on the source line 20. The combined coupling effect of the second line segment 311*b* and the fourth line segment 312*b* on the source line 20 tends to pull down the potential on the source line 20. Therefore, the combined coupling effect of the first line segment 311*a*, the second line segment 311*b*, the third line segment 312*a* and the fourth line segment 312*b* on the source line 20 tends to be "pulling up the potential on the source line 20" and "pulling down the potential on the source line 20" simultaneously. After these two coupling effects are mutually offset, the coupling effect of the first signal line group 310 on the source line 20 is reduced.

According to the display panel provided in the embodiment of the present disclosure, a position of the first line segment 311*a* and a position of the second line segment 311*b* in the first signal line 311 are adjusted, and a position of the third line segment 312*a* and a position of the fourth line segment 312*b* in the second signal line 312 are adjusted, so that the first signal line 311 and the second signal line 312 which transmit pulse signals having opposite polarities have similar coupling effects on the source line 20, and thus the overall coupling effect of the first signal line group 310 on the source line 20 is reduced. Therefore, the phenomenon of white vertical lines in the display panel is reduced, and the display effect of the display panel is improved.

Exemplarily, referring to FIGS. 1 and 2, the display panel includes a source line group 200, and the source line group 200 is located in the non-display region BB. A region where the source line group 200 is located is referred to as a fan-out region. The source line group 200 includes multiple source lines 20. In an implementation, the display panel includes two source line groups 200, and the two source line groups 200 are a first source line group 210 and a second source line group 220, respectively. The first signal line group 310 is disposed close to the first source line group 210, and an extension direction of the first signal line group 310 is basically the same as an extension direction of source lines 20 close to the first signal line group 310 in the first source line group 210. In an exemplary embodiment, in other implementations, the extension direction of the first signal line group 310 is the same as the extension direction of the source lines 20 close to the first signal line group 310 in the first source line group 210, and the first signal line group 310 is disposed along an edge of the first source line group 210. The first signal line group 310 is located on a side of the first source line group 210 along the first direction X. In addition, in other implementations, the display panel may also include one source line group 200, or at least three source line groups 200.

Exemplarily, referring to FIGS. 1 and 2, along the first direction X, the source lines 20, the first line segment 311*a* and the third line segment 312*a* overlap, and the source lines 20, the first line segment 311*a* and the third line segment 312*a* are arranged in sequence. Along the first direction X, the first line segment 311*a* is located between the source lines 20 and the third line segment 312*a*. Along the first direction X, the source lines 20, the fourth line segment 312*b* and second line segment 311*b* overlap, and the source lines 20, the fourth line segment 312*b* and second line segment 311*b* are arranged in sequence. Along the first direction X, the fourth line segment 312*b* is located between the source lines 20 and the second line segment 311*b*.

Exemplarily, referring to FIGS. 1 and 2, the first line segment 311*a* and the fourth line segment 312*b* are arranged along a direction perpendicular to the first direction X. The third line segment 312*a* and the second line segment 311*b* are arranged along the direction perpendicular to the first direction X. In an implementation, the direction perpendicular to the first direction X is an extension direction of a source line 20 closest to the first signal line group 310. Along the extension direction of the source line 20 closest to the first signal line group 310, two line segments which transmit opposite pulse signals exist. After the coupling effects of the two line segments which transmit opposite pulse signals are mutually offset, the coupling effect on the source line 20 is reduced. In the embodiment of the present disclosure, the positive coupling effect (pulling up the potential) and the negative coupling effect (pulling down the potential) on the source line 20 are balanced along the direction perpendicular to the first direction X. In other implementations, the extension direction of the source line 20 closest to the first signal line group 310 is not perpendicular to the first direction X and forms an included angle which is greater than 0 degree and less than 90 degrees with the first direction X.

In an implementation, the first line segment 311*a* and the fourth line segment 312*b* are set collinearly, that is, the first line segment 311*a* and the fourth line segment 312*b* are on the same straight line. In other implementations, the first line segment 311*a* and the fourth line segment 312*b* may not be collinear.

Exemplarily, the first line segment 311*a* and the fourth line segment 312*b* are set collinearly. The source line 20 closest to the first signal line group 310 is parallel to the first line segment 311*a*. The extension direction of the source line 20 closest to the first signal line group 310 is perpendicular to the first direction X. Along the first direction X, the distance between the first line segment 311*a* and the source line 20 is equal to the distance between the fourth line segment 312*b* and the source line 20. An example where the first signal line 311 transmits a positive-polarity pulse signal and the second signal line 312 transmits a negative-polarity pulse signal is illustrated. The first line segment 311*a* transmits the positive-polarity pulse signal, pulling up the potential on the source line 20. The fourth line segment 312*b* transmits the negative-polarity pulse signal, pulling down the potential on the source line 20. The first line segment 311*a* and the fourth line segment 312*b* are located at the same distance from the source line 20. After the coupling effect of the first line segment 311*a* and the coupling effect of the fourth line segment 312*b* on the source line 20 are mutually offset, the coupling effect on the source line 20 is reduced.

It is to be understood that due to process fluctuations or for special wiring purposes, the first line segment 311*a* and the fourth line segment 312*b* may be set to be not collinear. For example, the position of the first line segment 311*a* or the position of the fourth line segment 312*b* is slightly away from or close to the source line 20. A wiring direction of the first line segment 311*a* or a wiring direction of the fourth line segment 312*b* is slightly changed. The first line segment 311*a* and the fourth line segment 312*b* are located in the same first position region S21, and the first position region S21 extends along the direction perpendicular to the first direction X. Therefore, the distance difference between the distance between the first line segment 311*a* and the source line 20 and the distance between the fourth line segment 312*b* and the source line 20 is relatively small. After the coupling effect of the first line segment 311*a* and the coupling effect of the fourth line segment 312*b* on the source line 20 are mutually offset, the coupling effect on the source line 20 is reduced.

Similarly, in an implementation, the third line segment 312*a* and the second line segment 311*b* are set collinearly, that is, the third line segment 312*a* and the second line segment 311*b* are on the same straight line. Due to process fluctuations or for special wiring purposes, the third line segment 312*a* and the second line segment 311*b* may be set to be not collinear. The third line segment 312*a* and the second line segment 311*b* are located in the same second position region S22, and the second position region S22 extends along the direction perpendicular to the first direction X.

Figure 3:
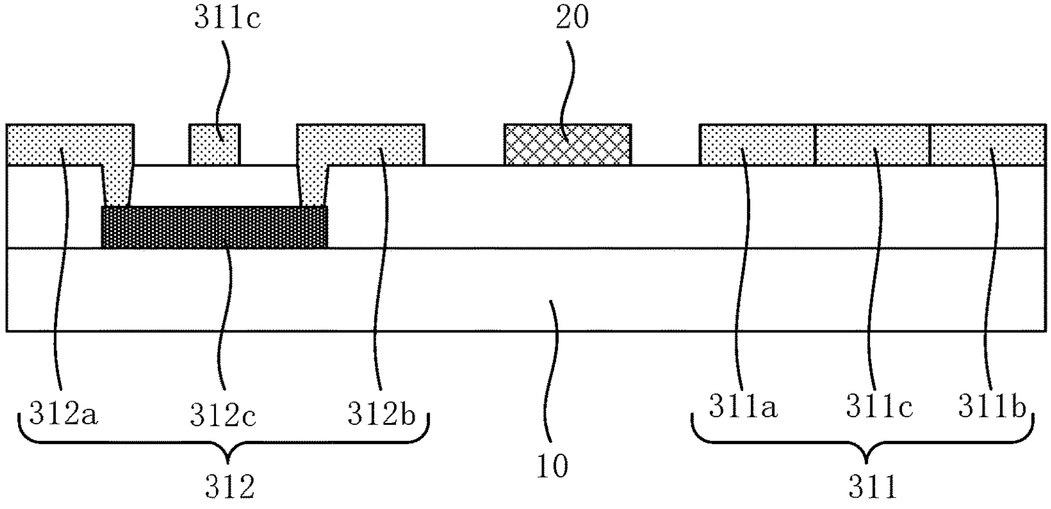
FIG. 3 is a sectional view taken along AA' in FIG. 2.

FIG. 3 is a sectional view taken along AA' in FIG. 2. Referring to FIGS. 2 and 3, the first signal line 311 further includes a first connecting line segment 311*c*, and the first connecting line segment 311*c* connects the first line segment 311*a* and the second line segment 311*b*. One end of the first connecting line segment 311*c* is connected to the first line segment 311*a*, and the other end of the first connecting line segment 311*c* is connected to the second line segment 311*b*. The first line segment 311*a* and the second line segment 311*b* are electrically connected through the first connecting line segment 311*c*. The second signal line 312 further includes a second connecting line segment 312*c*, and the second connecting line segment 312*c* connects the third line segment 312*a* and the fourth line segment 312*b*. One end of the second connecting line segment 312*c* is connected to the third line segment 312*a*, and the other end of the second connecting line segment 312*c* is connected to the fourth line segment 312*b*. The third line segment 312*a* and the fourth line segment 312*b* are electrically connected through the second connecting line segment 312*c*. Along the direction perpendicular to the plane where the substrate 10 is located, the second connecting line segment 312*c* overlaps the first connecting line segment 311*c* in different layers. In the embodiment of the present disclosure, the first signal line 311 and the second signal line 312 are wound. At an overlapping position of the first signal line 311 and the second signal line 312, the second connecting line segment 312*c* and/or the first connecting line segment 311*c* are set as a bridge, and thus no undesired electrical connection will occur between the second connecting line segment 312*c* and the first connecting line segment 311*c*, that is, a short circuit is avoided between the second connecting line segment 312*c* and the first connecting line segment 311*c*.

In an exemplary embodiment, referring to FIGS. 2 and 3, the first line segment 311*a*, the second line segment 311*b*, the third line segment 312*a*, the fourth line segment 312*b* and the first connecting line segment 311*c* are in the same layer. Therefore, the same material may be used for forming the first line segment 311*a*, the second line segment 311*b*, the third line segment 312*a*, and the fourth line segment 312*b* and the first connecting line segment 311*c* in the same process, so that processes are saved.

Exemplarily, referring to FIGS. 2 and 3, the first line segment 311*a*, the second line segment 311*b* and the first connecting line segment 311*c* are electrically connected in the same layer. The third line segment 312*a* and the fourth line segment 312*b* are electrically connected through the second connecting line segment 312*c* which is disposed in a different layer. One end of the second connecting line segment 312*c* is electrically connected to the third line segment 312*a* through a connecting via hole, and the other end of the second connecting line segment 312*c* is electrically connected to the fourth line segment 312*b* through a connecting via hole. Along the direction perpendicular to the plane where the substrate 10 is located, the second connecting line segment 312*c* is located between the first connecting line segment 311*c* and the substrate 10. In other implementations, the second connecting line segment 312*c* may also be located on a side of the first connecting line segment 311*c* facing away from the substrate 10.

Exemplarily, referring to FIGS. 2 and 3, the first line segment 311*a*, the second line segment 311*b*, the third line segment 312*a*, the fourth line segment 312*b* and the first connecting line segment 311*c* are in the same layer as the source lines 20. Therefore, the same material may be used for forming the first line segment 311*a*, the second line segment 311*b*, the third line segment 312*a*, the fourth line segment 312*b*, the first connecting line segment 311*c* and the source lines 20 in the same process, so that processes are saved.

In an exemplary embodiment, referring to FIGS. 2 and 3, a length of one first line segment 311*a* is the equal to a length of one fourth line segment 312*b*. The first line segment 311*a* and the fourth line segment 312*b* transmit pulse signals which have opposite polarities. The first line segment 311*a* and the fourth line segment 312*b* are located at the same distance or approximate distances from the source line 20. A length of part of the source line 20 which is affected by the coupling effect of the first line segment 311*a* is equal to a length of part of the source line 20 which is affected by the coupling effect of the fourth line segment 312*b*. After the coupling effect of the first line segment 311*a* and the coupling effect of the fourth line segment 312*b* on the source line 20 are mutually offset, the coupling effect on the source line 20 is reduced.

A length of one second line segment 311*b* is equal to a length of one third line segment 312*a*. The second line segment 311*b* and the third line segment 312*a* transmit pulse signals which have opposite polarities. The second line segment 311*b* and the third line segment 312*a* are located at the same distance or approximate distances from the source line 20. A length of part of the source line 20 which is affected by the coupling effect of the second line segment 311*b* is equal to a length of part of the source line 20 which is affected by the coupling effect of the third line segment 312*a*. After the coupling effect of the second line segment 311*b* and the coupling effect of the third line segment 312*a* on the source line 20 are mutually offset, the coupling effect on the source line 20 is reduced.

In an exemplary embodiment, referring to FIGS. 2 and 3, the first signal line 311 includes one first line segment 311*a* and one second line segment 311*b*, and the second signal line 312 includes one third line segment 312*a* and one fourth line segment 312*b*.

Exemplarily, referring to FIGS. 2 and 3, the first signal line 311 is composed of one first line segment 311*a*, one second line segment 311*b* and one first connecting line segment 311*c*. The second signal line 312 is composed of one third line segment 312*a*, one fourth line segment 312*b* and one second connecting line segment 312*c*. The first signal line 311 includes one first connecting line segment 311*c*, and the second signal line 312 includes one second connecting line segment 312*c*. Therefore, the number of second connecting line segments 312*c* serving as the bridge is reduced, the risk of a short circuit between the second connecting line segment 312*c* and the third line segment 312*a* is reduced, and the risk of a short circuit between the second connecting line segment 312*c* and the fourth line segment 312*b* is reduced, so that the risk of disconnection of the second signal line 312 is reduced.

Exemplarily, referring to FIGS. 2 and 3, the length of one first line segment 311*a* is equal to the length of one fourth line segment 312*b*. The first signal line 311 includes one first line segment 311*a* and one second line segment 311*b*, and the second signal line 312 includes one third line segment 312*a* and one fourth line segment 312*b*. The first half of the first position region S21 is the first line segment 311*a*, and the second half of the first position region S21 is the fourth line segment 312*b*. Correspondingly, the first half of the source line 20 is affected by the coupling effect of the first line segment 311*a*, and the second half of the source line 20 is affected by the coupling effect of the fourth line segment 312*b*. After the coupling effect of the first line segment 311*a* and the coupling effect of the fourth line segment 312*b* on the source line 20 are mutually offset, the coupling effect on the source line 20 is reduced.

The length of one second line segment 311*b* is equal to the length of one third line segment 312*a*. The first signal line 311 includes one first line segment 311*a* and one second line segment 311*b*, and the second signal line 312 includes one third line segment 312*a* and one fourth line segment 312*b*. The first half of the second position region S22 is the third line segment 312*a*, and the second half of the second position region S22 is the second line segment 311*b*. Correspondingly, the first half of the source line 20 is affected by the coupling effect of the third line segment 312*a*, and the second half of the source line 20 is affected by the coupling effect of the second line segment 311*b*. After the coupling effect of the second line segment 311*b* and the coupling effect of the third line segment 312*a* on the source line 20 are mutually offset, the coupling effect on the source line 20 is reduced.

Figure 4:
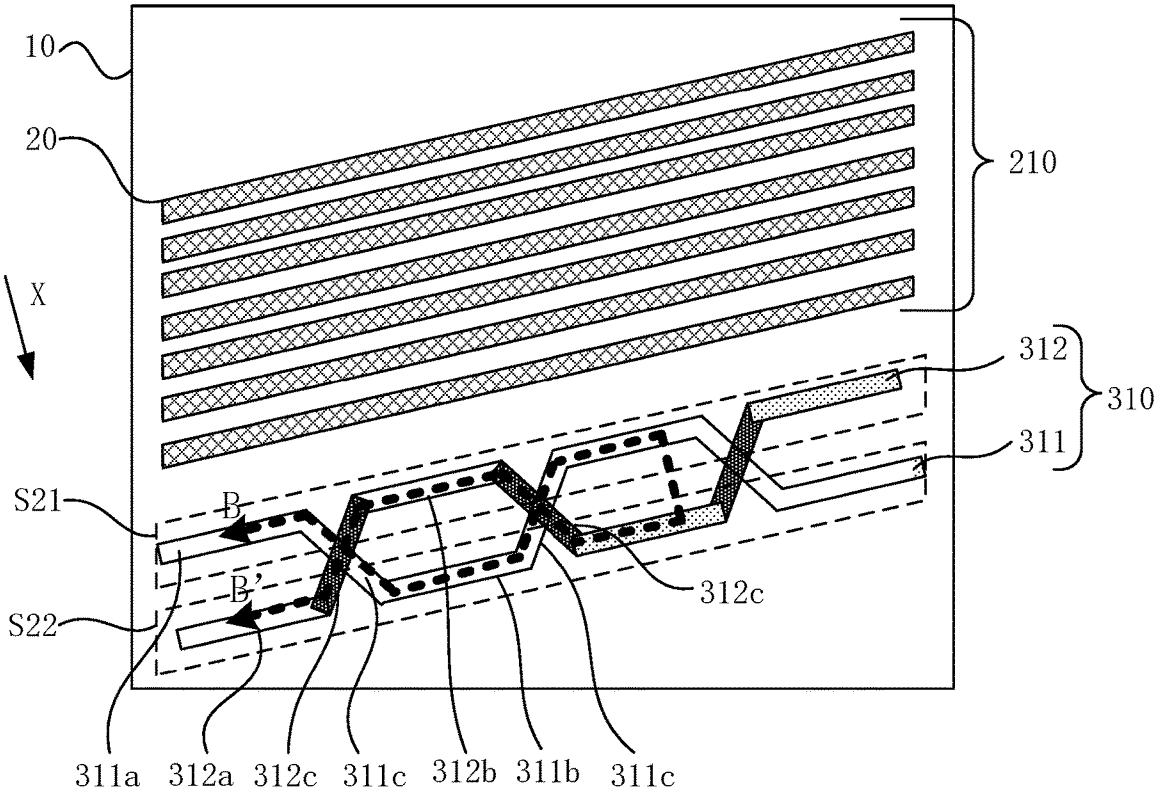
FIG. 4 is a top view of another display panel according to an embodiment of the present disclosure.
Figure 5:
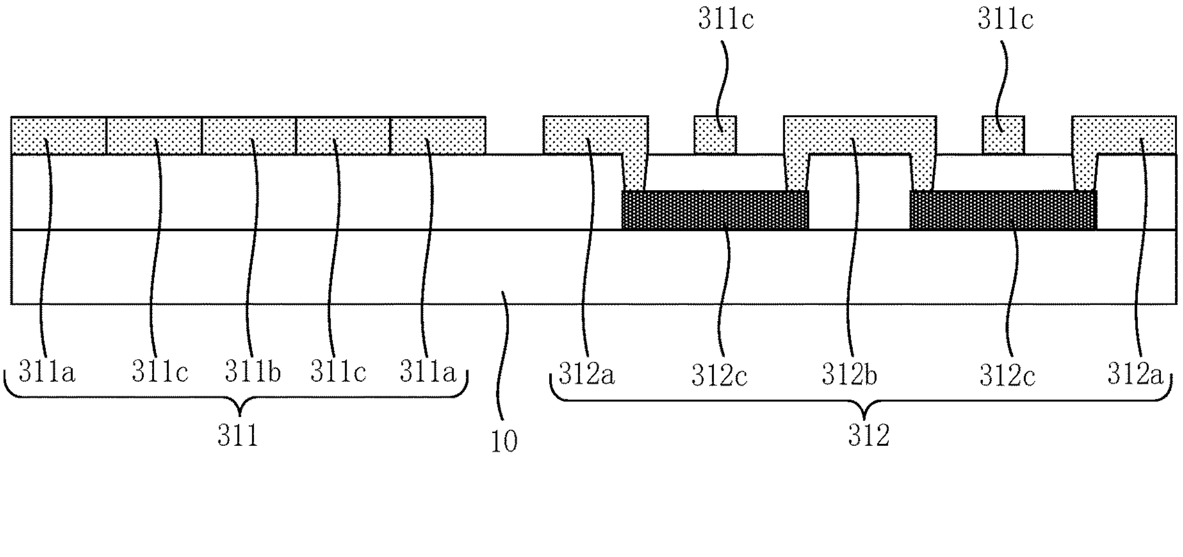
FIG. 5 is a sectional view taken along BB' in FIG. 4.

FIG. 4 is a top view of another display panel according to an embodiment of the present disclosure, and FIG. 5 is a sectional view taken along BB' in FIG. 4. Referring to FIGS. 4 and 5, the first signal line 311 includes multiple first line segments 311*a* and multiple second line segments 311*b*, and the multiple first line segments 311*a* and the multiple second line segments 311*b* are arranged alternately. In the same first signal line 311, one second line segment 311*b* exists between two adjacent first line segments 311*a*, and one first line segment 311*a* exists between two adjacent second line segments 311*b*. The second signal line 312 includes multiple third line segments 312*a* and multiple fourth line segments 312*b*, and the multiple third line segments 312*a* and the multiple fourth line segments 312*b* are arranged alternately. In the same second signal line 312, one fourth line segment 312*b* exists between two adjacent third line segments 312*a*, and one third line segment 312*a* exists between two adjacent fourth line segments 312*b*.

In the first position region S21, first line segments 311*a* and fourth line segments 312*b* are arranged alternately along the direction perpendicular to the first direction X. That is, first line segments 311*a* and fourth line segments 312*b* are arranged in the following manner: a first line segment 311*a*, a fourth line segment 312*b*, a first line segment 311*a*, a fourth line segment 312*b*, Thus, along the direction perpendicular to the first direction X, coupling effects on various line segments of the source line 20 are pulling up the voltage, pulling down the voltage, pulling up the voltage, pulling down the voltage, . . . , respectively. Therefore, a distance between coupling pairs of which coupling effects on the source line 20 are mutually offset is reduced, and the effect of mutual offsetting between the positive coupling effect and the negative coupling effect along the direction perpendicular to the first direction X is improved. In the second position region S22, third line segments 312*a* and second line segments 311*b* are arranged alternately along the direction perpendicular to the first direction X. That is, third line segments 312*a* and second line segments 311*b* are arranged in the following manner: a third line segment 312*a*, a second line segment 311*b*, a third line segment 312*a*, a second line segment 311*b*, . . . . Thus, along the direction perpendicular to the first direction X, coupling effects on various line segments of the source line 20 are pulling up the voltage, pulling down the voltage, pulling up the voltage, pulling down the voltage, . . . , respectively. Therefore, the distance between coupling pairs of which coupling effects on the source line 20 are mutually offset is reduced, and the effect of mutual offsetting between the positive coupling effect and the negative coupling effect along the direction perpendicular to the first direction X is improved.

Exemplarily, referring to FIGS. 4 and 5, the first line segment 311*a* and the second line segment 311*b* are electrically connected through the first connecting line segment 311*c*. The third line segment 312*a* and the fourth line segment 312*b* are electrically connected through the second connecting line segment 312*c*.

Figure 6:
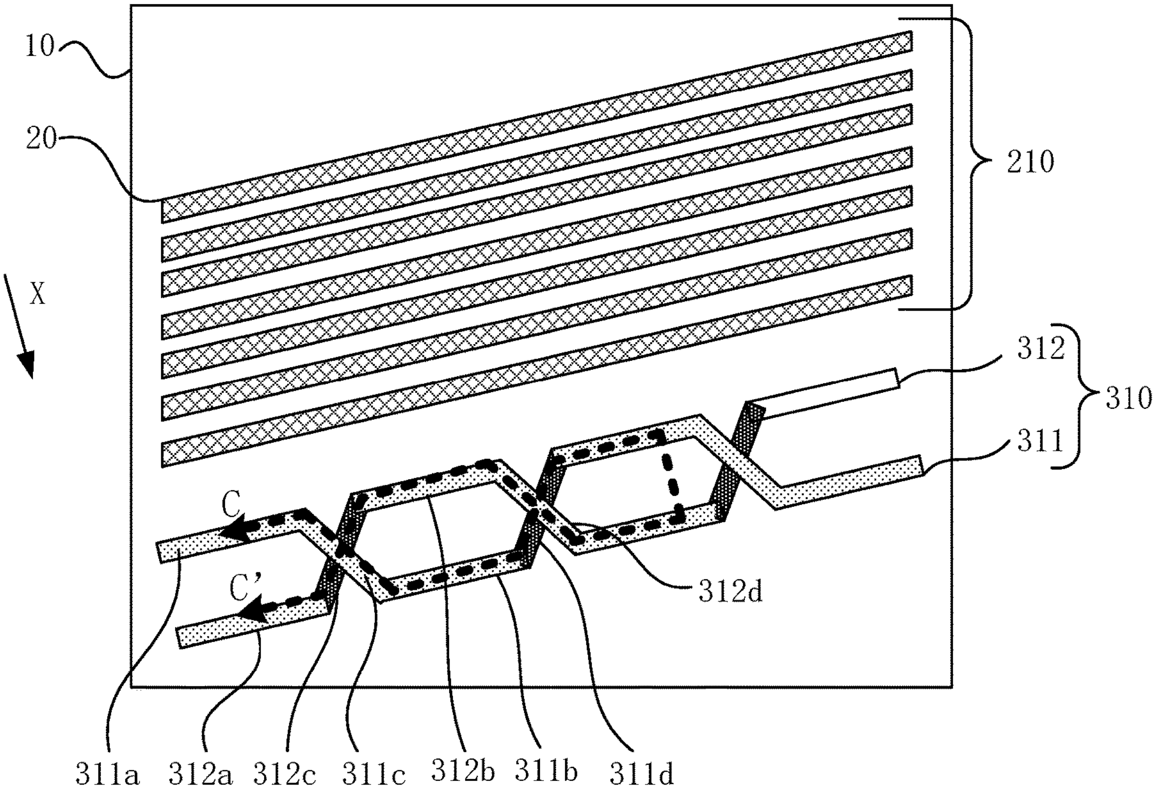
FIG. 6 is a top view of another display panel according to an embodiment of the present disclosure.
Figure 7:
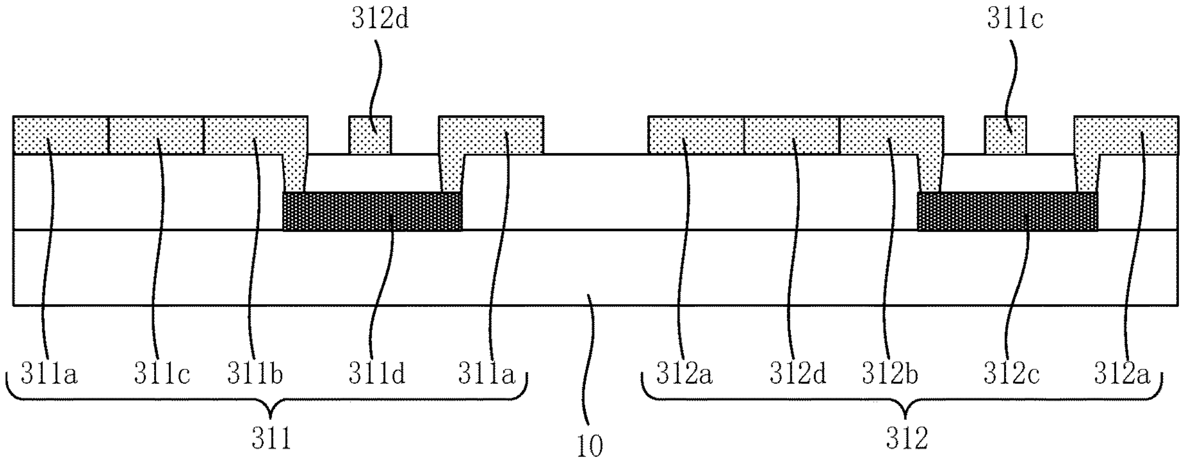
FIG. 7 is a sectional view taken along CC' in FIG. 6.

FIG. 6 is a top view of another display panel according to an embodiment of the present disclosure, and FIG. 7 is a sectional view taken along CC' in FIG. 6. Referring to FIGS. 6 and 7, the first signal line 311 further includes a third connecting line segment 311*d*. The first line segment 311*a* and the second line segment 311*b* are connected through the first connecting line segment 311*c*. Alternatively, the first line segment 311*a* and the second line segment 311*b* are connected through the third connecting line segment 311*d*. The second signal line 312 further includes a fourth connecting line segment 312*d*, and the third line segment 312*a* and the fourth line segment 312*b* are connected through the second connecting line segment 312*c*. Alternatively, the third line segment 312*a* and the fourth line segment 312*b* are connected through the fourth connecting line segment 312*d*. The first connecting line segment 311*c* and the fourth connecting line segment 312*d* are in the same layer. The third connecting line segment 311*d* and the second connecting line segment 312*c* are in the same layer. Along the direction perpendicular to the plane where the substrate 10 is located, the third connecting line segment 311*d* overlaps the fourth connecting line segment 312*d* in different layers. In the embodiment of the present disclosure, in the first signal line 311, the third connecting line segment 311*d* serves as a bridge. In the second signal line 312, the second connecting line segment 312*c* serves as a bridge. The third connecting line segment 311*d* and the second connecting line segment 312*c* are in the same layer, so that the resistance difference between the third connecting line segment 311*d* and the second connecting line segment 312*c* is reduced, and the resistance difference between the first signal line 311 and the second signal line 312 is reduced; therefore, the strength difference between the pulse signal transmitted by the first signal line 311 and the pulse signal transmitted by the second signal line 312 is reduced, and thus the effect of mutual offsetting between the positive coupling effect and the negative coupling effect of the first signal line 311 and the second signal line 312 on the source line 20 is improved.

Exemplarily, referring to FIGS. 6 and 7, in the same first signal line 311, first connecting line segments 311*c* and third connecting line segments 311*d* are arranged alternately. That is, line segments in the same first signal line 311 are arranged in the following manner: a first line segment 311*a*, a first connecting line segment 311*c*, a second line segment 311*b*, a third connecting line segment 311*d*, a first line segment 311*a*, a first connecting line segment 311*c*, a second line segment 311*b*, a third connecting line segment 311*d*, . . . . First line segments 311*a* and second line segments 311*b* are alternately connected through first connecting line segments 311*c* or third connecting line segments 311*d*. In the same second signal line 312, second connecting line segments 312*c* and fourth connecting line segments 312*d* are arranged alternately. That is, line segments in the same second signal line 312 are arranged in the following manner: a third line segment 312*a*, a second connecting line segment 312*c*, a fourth line segment 312*b*, a fourth connecting line segment 312*d*, a third line segment 312*a*, a second connecting line segment 312*c*, a fourth line segment 312*b*, a fourth connecting line segment 312*d*, . . . . Third line segments 312*a* and fourth line segments 312*b* are alternately connected through second connecting line segments 312*c* or fourth connecting line segments 312*d*. In the embodiment of the present disclosure, the number of third connecting line segments 311*d* is the same as or approximate to the number of second connecting line segments 312*c*, so that the difference between the number of third connecting line segments 311*d* and the number of second connecting line segments 312*c* is reduced, and the difference between the number of bridges in the first signal line 311 and the number of bridges in the second signal line 312 is reduced; therefore, the resistance difference between the first signal line 311 and the second signal line 312 is reduced, and thus the strength difference between the pulse signal transmitted by the first signal line 311 and the pulse signal transmitted by the second signal line 312 is reduced.

Figure 8:
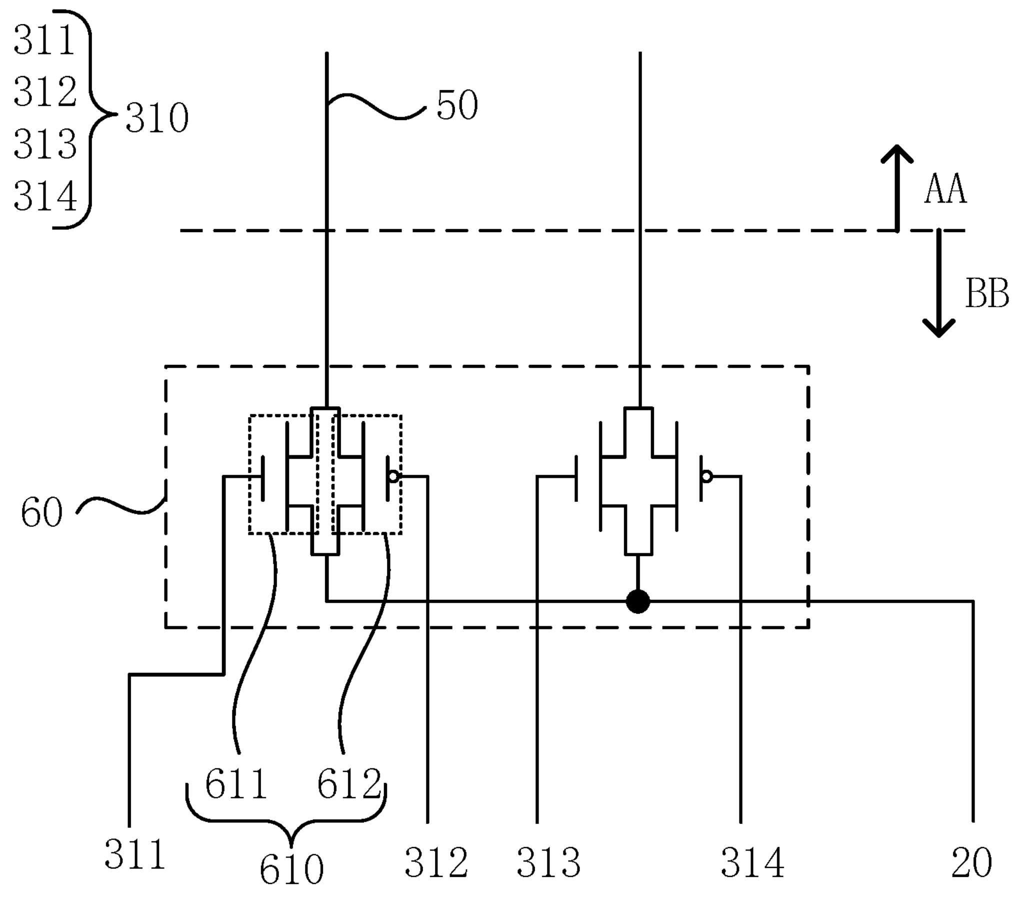
FIG. 8 is a diagram showing a circuit connection relationship of source lines in region S12 in FIG. 1.

FIG. 8 is a diagram showing a circuit connection relationship of source lines in region S12 in FIG. 1. Referring to FIGS. 1 and 8, the display panel further includes a data line 50. At least part of the data line 50 is located in the display region AA, and the data line 50 may extend from the display region AA to the non-display region BB. The data line 50 is coupled with the source line 20. The source line 20 provides a data signal for the data line 50.

In an exemplary embodiment, referring to FIGS. 1 and 8, the display panel further includes a multiplexer circuit 60. The multiplexer circuit 60 is located in the non-display region BB. The multiplexer circuit 60 includes a switch transistor 610. A first electrode of the switch transistor 610 is coupled to the data line 50, a second electrode of the switch transistor 610 is coupled to the source line 20, and a gate of the switch transistor 610 is coupled to the first signal line 311 or the second signal line 312.

Exemplarily, referring to FIG. 1, the multiplexer circuit 60 is located on the periphery of the source line groups 200. In an implementation, the multiplexer circuits 60 are located between the source line group 200 and the display region AA.

Exemplarily, referring to FIGS. 1 and 8, the display panel further includes multiple data lines 50, and the multiplexer circuit 60 includes multiple switch transistors 610. One data line 50 is coupled to the first electrode of one switch transistor 610, and second electrodes of at least two switch transistors 610 are coupled to the same source line 20. In this manner, the switch transistor 610 is controlled to be turned on or turned off, so that one of at least two data lines 50 is controlled to be electrically connected with the source line 20, and other data lines 50 are not electrically connected to the source line 20. Therefore, the same source line 20 can provide data signals for at least two data lines 50 in a time division manner.

In an exemplary embodiment, with continued reference to FIGS. 1 and 8, the switch transistor 610 includes a first switch sub-transistor 611 and a second switch sub-transistor 612. A first electrode of the first switch sub-transistor 611 is electrically connected to a first electrode of the second switch sub-transistor 612. A second electrode of the first switch sub-transistor 611 is electrically connected to a second electrode of the second switch sub-transistor 612. A gate of the first switch sub-transistor 611 is coupled to the first signal line 311, and a gate of the second switch sub-transistor 612 is coupled to the second signal line 312. In the embodiment of the present disclosure, one of the first switch sub-transistor 611 and the second switch sub-transistor 612 is an n-channel metal-oxide semiconductor (NMOS) transistor, the other one of the first switch sub-transistor 611 and the second switch sub-transistor 612 is a p-channel metal-oxide semiconductor (PMOS) transistor, and the switch transistor 610 is a complementary metal-oxide semiconductor (CMOS). The first signal line 311 and the second signal line 312 transmit pulse signals which have opposite polarities. The first switch sub-transistor 611 and the second switch sub-transistor 612 are simultaneously turned on or turned off. In this setting, the switch transistor 610 is a CMOS transistor, and the first switch sub-transistor 611 and the second switch sub-transistor 612 are controlled in opposite manners, so that the switch transistor 610 have characteristics of low power consumption, high speed and high reliability.

Figure 9:
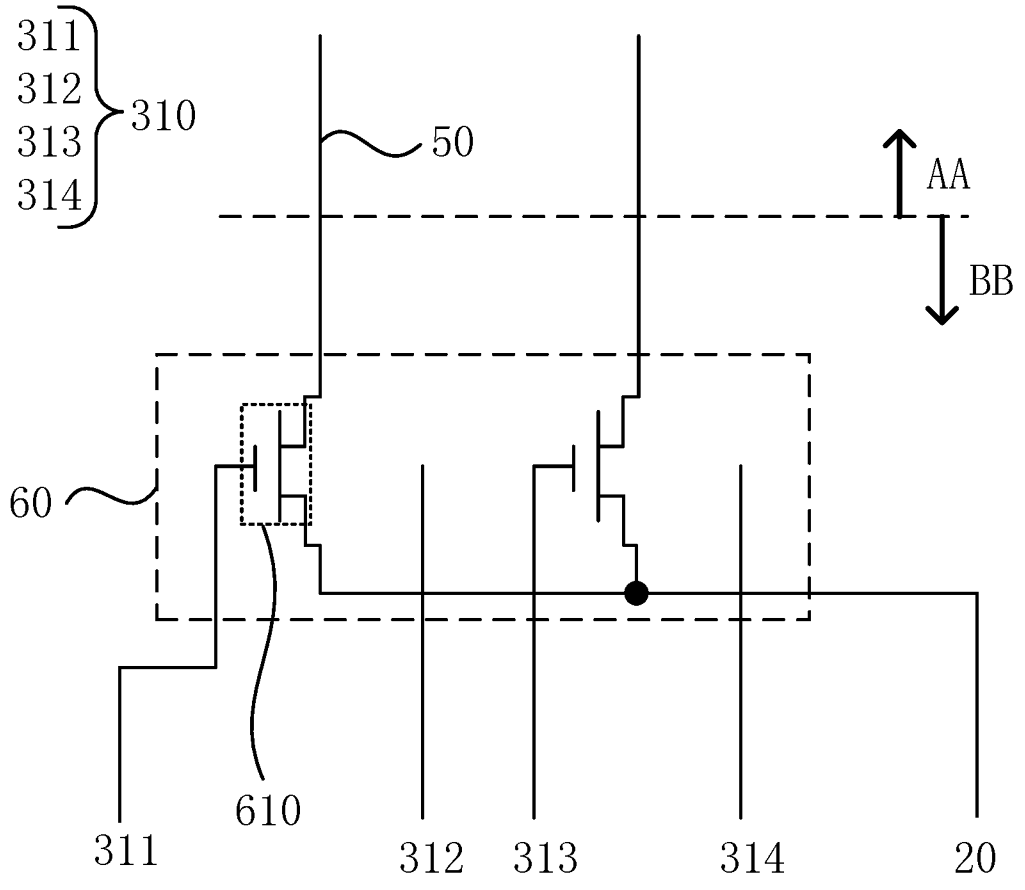
FIG. 9 is a diagram showing another circuit connection relationship of source lines according to an embodiment of the present disclosure.

FIG. 9 is a diagram showing another circuit connection relationship of source lines according to an embodiment of the present disclosure. Referring to FIG. 9, the gate of the switch transistor 610 is coupled to the first signal line 311, and the gate of the switch transistor 610 is electrically insulated from the second signal line 312.

Exemplarily, referring to FIG. 9, the switch transistor 610 may be an NMOS transistor, and the first signal line 311 may transmit a positive-polarity pulse signal, so that the gate of the switch transistor 610 is coupled to the first signal line 311, and the switch transistor 610 is controlled to be turned on and turned off through the first signal line 311. The second signal line 312 may transmit a negative-polarity pulse signal; the NMOS transistor is a high-level turned-on transistor, that is, the second signal line 312 is not needed to be electrically connected to the switch transistor 610, but the coupling effect of the first signal line 311 on the source line 20 and the coupling effect of the second signal line 312 on the source line 20 need to be mutually offset. Further, in this implementation, the second signal line 312 is disposed in the display panel, and the second signal line 312 is electrically insulated from the gate of the switch transistor 610, that is, the second signal line 312 is set floating.

Figure 10:
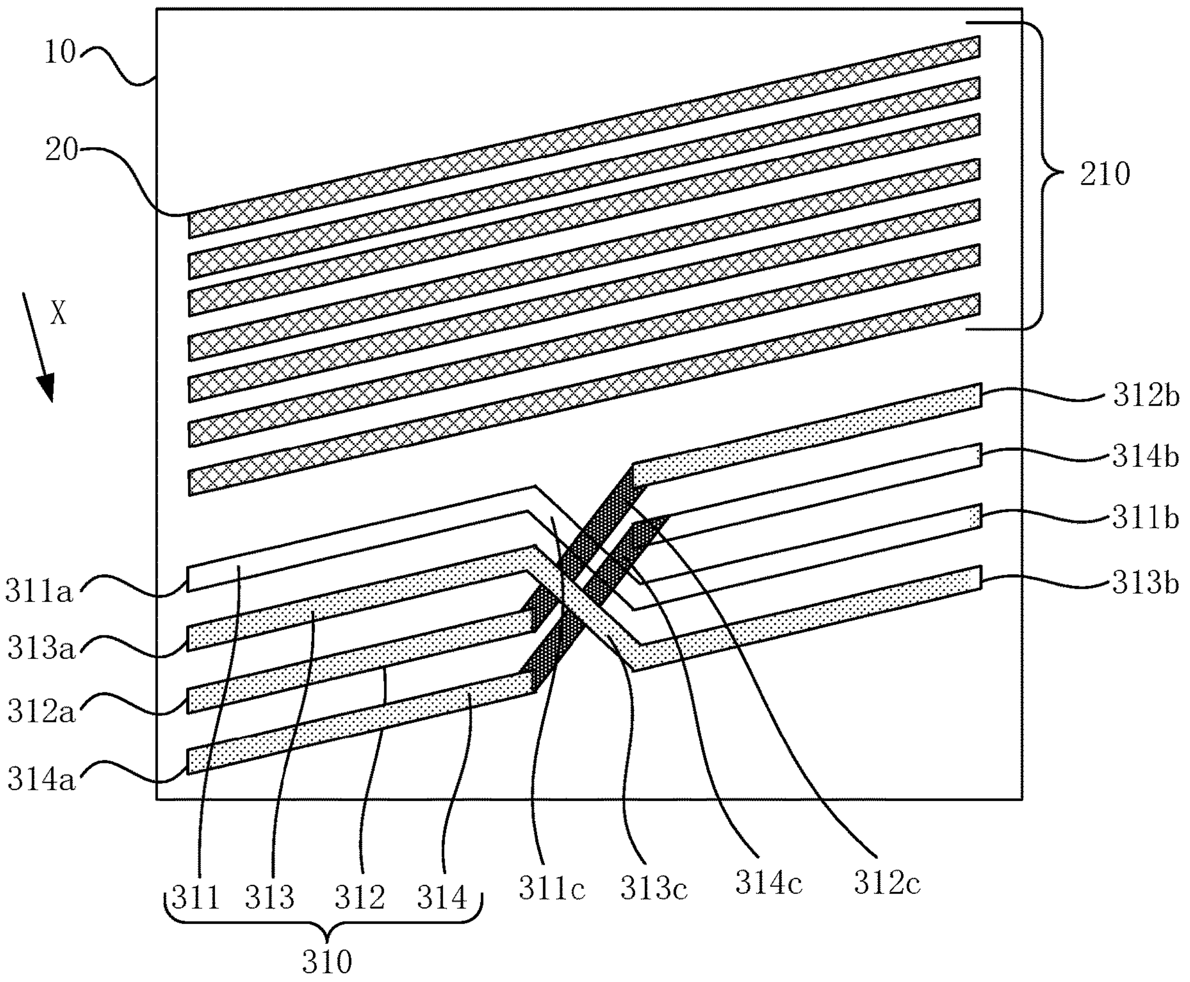
FIG. 10 is a top view of another display panel according to an embodiment of the present disclosure.

FIG. 10 is a top view of another display panel according to an embodiment of the present disclosure. Referring to FIG. 10, the first signal line group 310 further includes a third signal line 313 and a fourth signal line 314. The third signal line 313 and the fourth signal line 314 transmit pulse signals which have opposite polarities. The third signal line 313 and the first signal line 311 transmit pulse signals which have the same polarity, and the fourth signal line 314 and the second signal line 312 transmit pulse signals which have the same polarity.

The third signal line 313 includes a fifth line segment **313*a* and a sixth line segment 313*b* which are coupled. The fourth signal line 314 includes a seventh line segment 314*a* and an eighth line segment 314*b* which are coupled. Along the first direction X, the source line 20, the first line segment 311*a*, the fifth line segment 313*a* and the third line segment 312*a* overlap. Along the first direction X, the fifth line segment 313*a* is located between the first line segment 311*a* and the third line segment 312*a*. Along the first direction X, the source line 20, the first line segment 311*a*, the third line segment 312*a* and the seventh line segment 314*a* overlap. Along the first direction X, the seventh line segment 314*a* is located on a side of the third line segment 312*a* facing away from the first line segment 311*a*. The source lines 20, the first line segment 311*a*, the fifth line segment 313*a*, the third line segment 312*a* and the seventh line segment 314*a* are arranged along the first direction X. Therefore, along the first direction X, a distance between the fifth line segment 313*a* and the source line 20 is less than a distance between the seventh line segment 314*a* and the source line 20**.

Along the first direction X, the source line 20, the fourth line segment **312*b*, the second line segment 311*b* and the eighth line segment 314*b* overlap. Along the first direction X, the eighth line segment 314*b* is located between the fourth line segment 312*b* and the second line segment 311*b*. Along the first direction X, the source line 20, the fourth line segment 312*b*, the second line segment 311*b* and the sixth line segment 313*b* overlap. The sixth line segment 313*b* is located on a side of the second line segment 311*b* away from the fourth line segment 312*b*. The source lines 20, the fourth line segment 312*b*, the eighth line segment 314*b* and the sixth line segment 313*b* are arranged along the first direction X. Therefore, a distance between the sixth line segment 313*b* and the source line 20 is greater than a distance between the eighth line segment 314*b* and the source line 20**.

In an implementation, the fifth line segment **313*a* and the eighth line segment 314*b* are set collinearly. In other implementations, the fifth line segment 313*a* and the eighth line segment 314*b*** may not be collinear.

Exemplarily, the fifth line segment **313*a* and the eighth line segment 314*b* are set collinearly. The source line 20 closest to the first signal line group 310 is parallel to the fifth line segment 313*a*. The extension direction of the source line 20 closest to the first signal line group 310 is perpendicular to the first direction X. Along the first direction X, the distance between the fifth line segment 313*a* and the source line 20 is equal to the distance between the eighth line segment 314*b* and the source line 20. The fifth line segment 313*a* and the eighth line segment 314*b* are located at the same distance from the source line 20; after the coupling effect of the fifth line segment 313*a* and the coupling effect of the eighth line segment 314*b* on the source line 20 are mutually offset, the coupling effect on the source line 20 is reduced. It is to be understood that due to process fluctuations or for special wiring purposes, the fifth line segment 313*a* and the eighth line segment 314*b*** may be set to be not collinear.

In an implementation, the seventh line segment **314*a* and the sixth line segment 313*b* are set collinearly. In other implementations, the seventh line segment 314*a* and the sixth line segment 314*b*** may not be collinear.

Exemplarily, the seventh line segment **314*a* and the sixth line segment 313*b* are set collinearly. The source line 20 closest to the first signal line group 310 is parallel to the seventh line segment 314***a*. The extension direction of the source line 20 closest to the first signal line group 310 is perpendicular to the first direction X. Along the first direction X, the distance between the seventh line segment 314*a* and the source line 20 is equal to the distance between the sixth line segment 313*b* and the source line 20. The seventh line segment 314*a* and the sixth line segment 313*b* are located at the same distance from the source line 20; after the coupling effect of the seventh line segment 314*a* and the coupling effect of the sixth line segment 313*b* on the source line 20 are mutually offset, the coupling effect on the source line 20 is reduced. It is to be understood that due to process fluctuations or for special wiring purposes, the seventh line segment 314*a* and the sixth line segment 313*b* may be set to be not collinear.

In the embodiment of the present disclosure, the first signal line 311 and the second signal line 312 which transmit pulse signals having opposite polarities have similar coupling effects on the source line 20, and the third signal line 313 and the fourth signal line 314 which transmit pulse signals having opposite polarities have similar coupling effects on the source line 20, so that the overall coupling effect of the first signal line group 310 on the source line 20 is reduced, the phenomenon of white vertical lines in the display panel is reduced, and the display effect of the display panel is improved.

Exemplarily, referring to FIG. 10, the first line segment 311*a*, the second line segment 311*b*, the third line segment 312*a*, the fourth line segment 312*b*, the fifth line segment 313*a*, the sixth line segment 313*b*, the seventh line segment 314*a* and the eighth line segment 314*b* are arranged in the same layer, so that the same material may be used for simultaneously forming the first line segment 311*a*, the second line segment 311*b*, the third line segment 312*a*, the fourth line segment 312*b*, the fifth line segment 313*a*, the sixth line segment 313*b*, the seventh line segment 314*a* and eighth line segment 314*b* in the same process, and thus processes are simplified.

Exemplarily, referring to FIG. 10, the third signal line 313 further includes a fifth connecting line segment 313*c*, and the fifth connecting line segment 313*c* connects the fifth line segment 313*a* and the sixth line segment 313*b*. The fourth signal line 314 further includes a sixth connecting line segment 314*c*, and the sixth connecting line segment 314*c* connects the seventh line segment 314*a* and the eighth line segment 314*b*. The fifth connecting line segment 313*c* and the fifth line segment 313*a* are in the same layer. The sixth connecting line segment 314*c* and the second connecting line segment 312*c* are in the same layer. The sixth connecting line segment 314*c* overlaps the first connecting line segment 311*c* in different layers. The sixth connecting line segment 314*c* overlaps the fifth connecting line segment 313*c* in different layers. The fifth connecting line segment 313*c* overlaps the second connecting line segment 312*c* in different layers.

Figure 11:
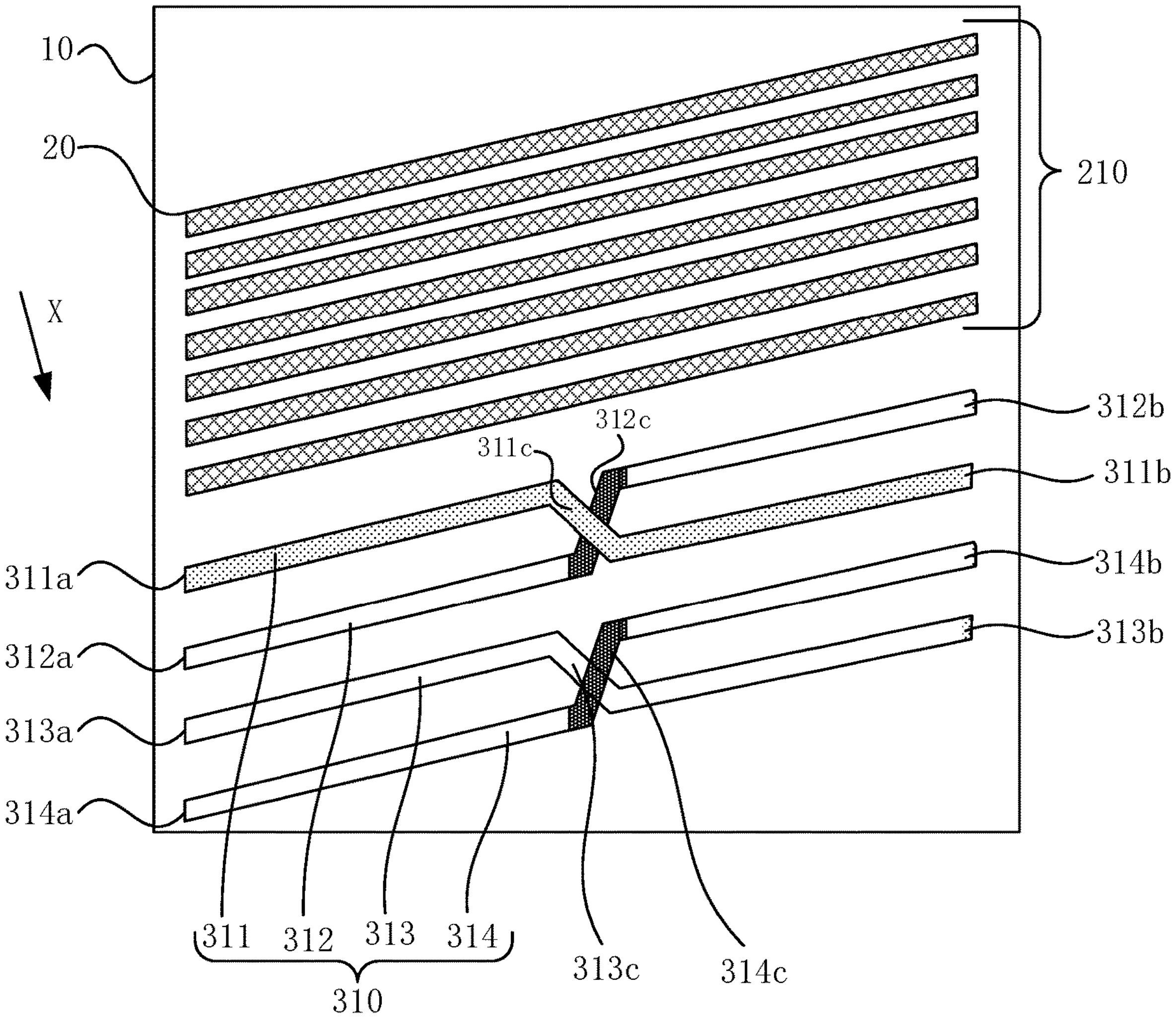
FIG. 11 is a top view of another display panel according to an embodiment of the present disclosure.

FIG. 11 is a top view of another display panel according to an embodiment of the present disclosure, and a winding manner in FIG. 11 of the first signal line 311, the second signal line 312, the third signal line 313 and the fourth signal line 314 is different from the winding manner in FIG. 10 of the first signal line 311, the second signal line 312, the third signal line 313 and the fourth signal line 314. Referring to FIG. 11, along the first direction X, the seventh line segment 314*a* is located on the side of the third line segment 312*a* facing away from the first line segment 311*a*. Along the first direction X, the fifth line segment 313*a* is located between the third line segment 312*a* and the seventh line segment 314*a*. Along the first direction X, the sixth line segment 313*b* is located on the side of the second line segment 311*b* facing away from the fourth line segment 312*b*. Along the first direction X, the eighth line segment 314*b* is located between the second line segment 311*b* and the sixth line segment 313*b*. In the embodiment of the present disclosure, the first signal line 311 and the second signal line 312 form a double-wound line, and the third signal line 313 and the fourth signal line 314 form a double-wound line. A position relationship of various line segments in the third signal line 313 and the fourth signal line 314 is similar to a position relationship of various line segments in the first signal line 311 and the second signal line 312, and will not be repeated here.

Figure 12:
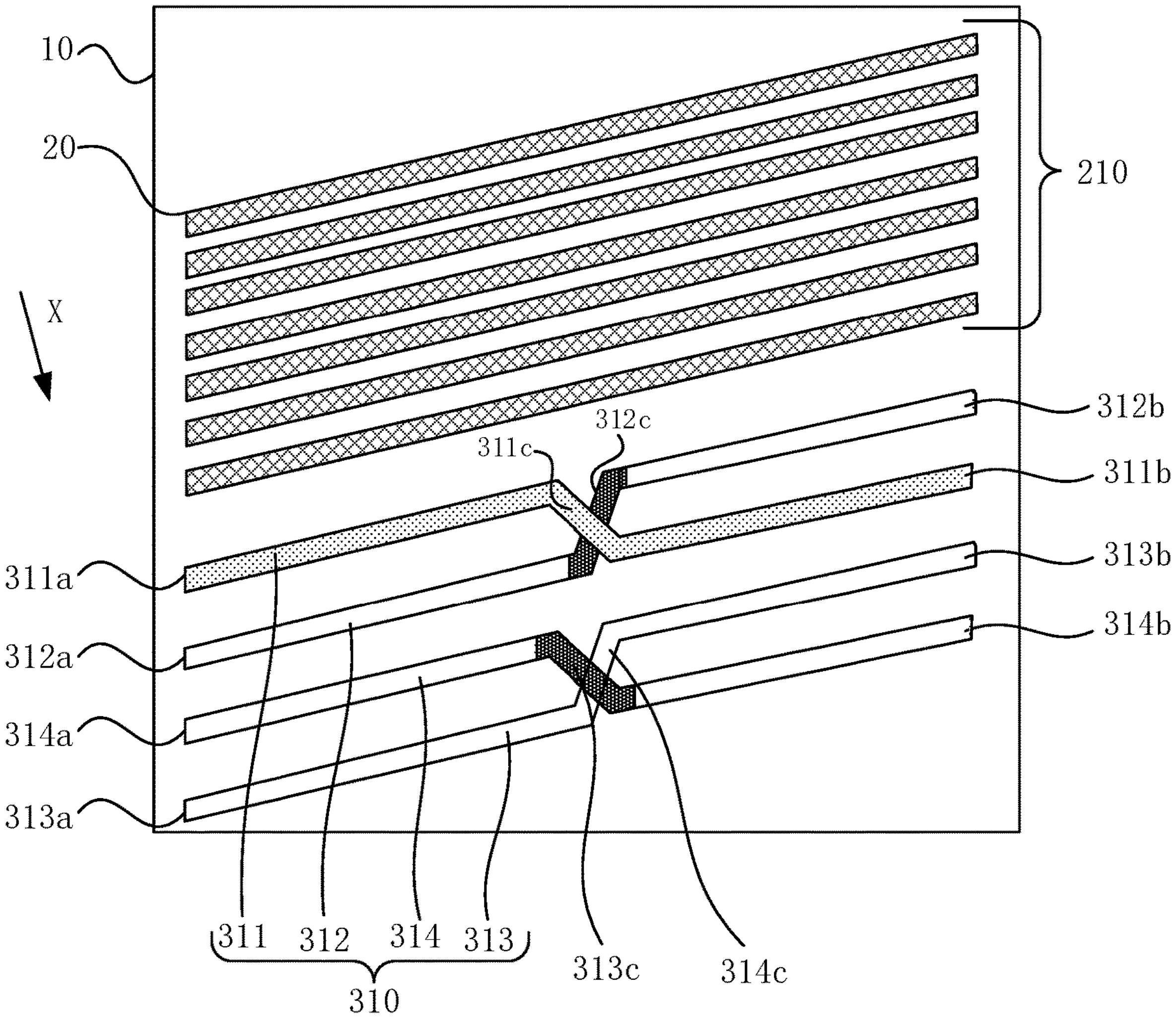
FIG. 12 is a top view of another display panel according to an embodiment of the present disclosure.

FIG. 12 is a top view of another display panel according to an embodiment of the present disclosure, and a winding manner in FIG. 12 of the third signal line 313 and the fourth signal line 314 is different from a winding manner in FIG. 11 of the third signal line 313 and the fourth signal line 314. Referring to FIG. 12, along the first direction X, the seventh line segment 314*a* is located on the side of the third line segment 312*a* facing away from the first line segment 311*a*. Along the first direction X, the fifth line segment 313*a* is located on a side of the seventh line segment 314*a* facing away from the third line segment 312*a*. Along the first direction X, the sixth line segment 313*b* is located on the side of the second line segment 311*b* facing away from the fourth line segment 312*b*. Along the first direction X, the eighth line segment 314*b* is located on a side of the sixth line segment 313*b* facing away from the second line segment 311*b*. In the embodiment of the present disclosure, the first line segment 311*a* and the fifth line segment 313*a* transmit pulse signals which have the same polarity, the third line segment 312*a* and the seventh line segment 314*a* transmit pulse signals which have the same polarity, and the first line segment 311*a* and the third line segment 312*a* transmit pulse signals which have opposite polarities. The first line segment 311*a*, the third line segment 312*a*, the seventh line segment 314*a* and the fifth line segment 313*a* are arranged along the first direction X and away from the source line 20. An example where the first signal line 311 and the third signal line 313 transmit positive-polarity pulse signals and the second signal line 312 and the fourth signal line 314 transmit negative-polarity pulse signals is illustrated. The combined coupling effect of the first line segment 311*a* and the third line segment 312*a* on the source line 20 tends to pull up the potential on the source line 20. The combined coupling effect of the seventh line segment 314*a* and the fifth line segment 313*a* on the source line 20 tends to pull down the potential on the source line 20. Therefore, the combined coupling effect of the first line segment 311*a*, the third line segment 312*a*, the fifth line segment 313*a* and the seventh line segment 314*a* on the source line 20 tends to be "pulling up the potential on the source line 20" and "pulling down the potential on the source line 20" simultaneously. After these two coupling effects are mutually offset, the coupling effect of the first signal line group 310 on the source line 20 is reduced. It is to be noted that since along the first direction X, the first line segment 311*a*, the third line segment 312*a*, the fifth line segment 313*a* and the seventh line segment 314*a* overlap the source line 20, the first line segment 311*a*, the third line segment 312*a*, the fifth line segment 313*a* and the seventh line segment 314*a* generate coupling effects on the same segment (such as the first half) of the source line 20. Therefore, in the embodiment of the present disclosure, not only the positive coupling effect (pulling up the potential) and the negative coupling effect (pulling down the potential) on the source line 20 are balanced along the direction perpendicular to the first direction X, but also the positive coupling effect (pulling up the potential) and the negative coupling effect (pulling down the potential) on the source line 20 are balanced along the first direction X.

Figure 13:
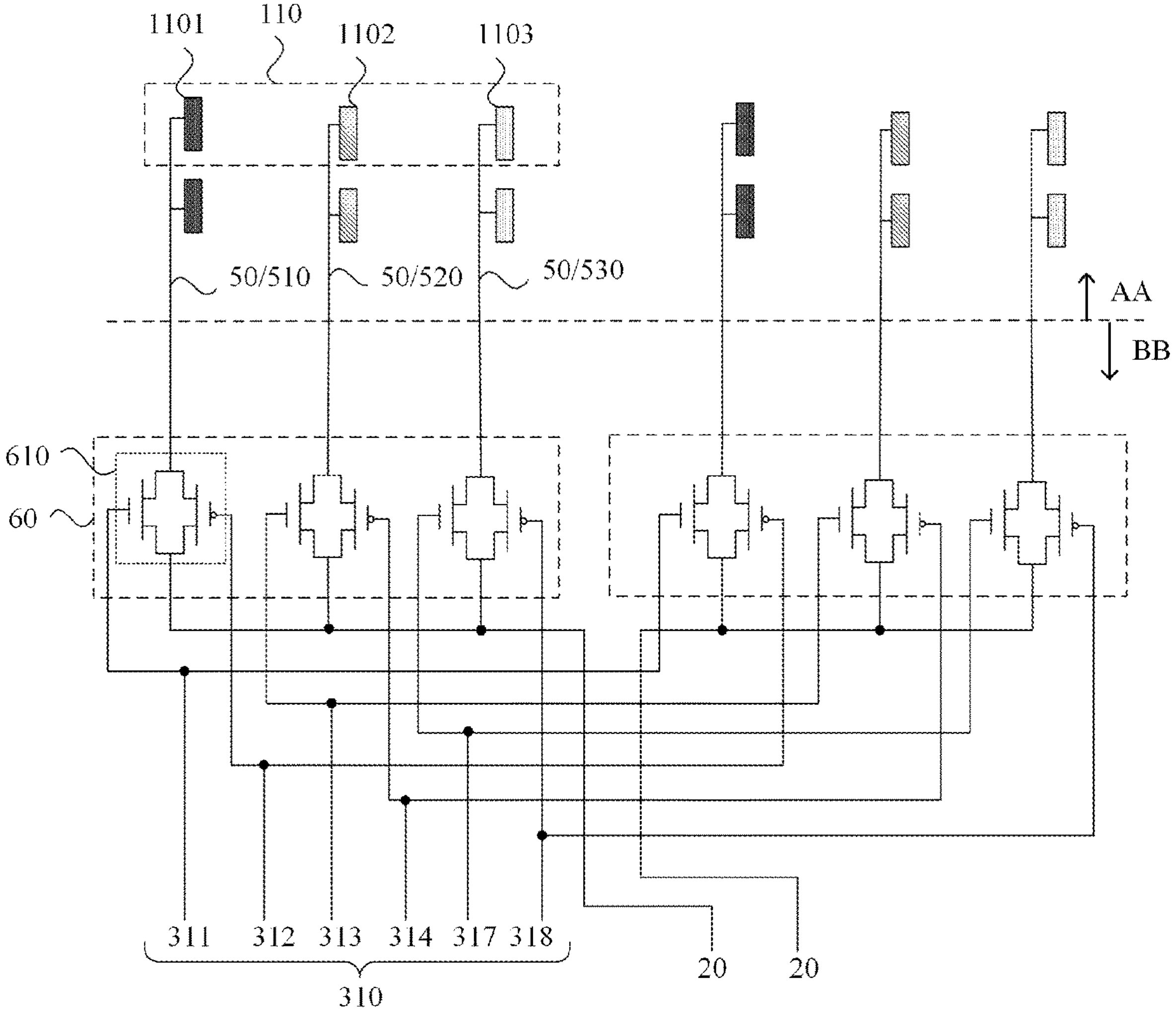
FIG. 13 is a diagram showing another circuit connection relationship of source lines according to an embodiment of the present disclosure.

FIG. 13 is a diagram showing another circuit connection relationship of source lines according to an embodiment of the present disclosure. Referring to FIG. 13, the first signal line group 310 includes the first signal line 311, the second signal line 312, the third signal line 313 and the fourth signal line 314. The first signal line group 310 may further include a seventh signal line 317 and an eighth signal line 318. The first signal line 311, the third signal line 313 and the seventh signal line 317 transmit pulse signals which have the same polarity. The second signal line 312, the fourth signal line 314 and the eighth signal line 318 transmit pulse signals which have the same polarity. The seventh signal line 317 and the eighth signal line 318 transmit pulse signals which have opposite polarities. In the embodiment of the present disclosure, the first signal line group 310 may include six signal lines. In other implementations, the first signal line groups 310 may include other numbers of signal lines.

Exemplarily, referring to FIG. 13, the display region AA includes multiple pixels 110. The pixels 110 include red light-emitting sub-pixels 1101, green light-emitting sub-pixels 1102, and blue light-emitting sub-pixels 1103. Data lines 50 include first data lines 510, second data lines 520 and third data lines 530. A first data line 510 is connected to a red light-emitting sub-pixel 1101 and the first electrode of a switch transistor 610, a second data line 520 is connected to a green light-emitting sub-pixel 1102 and the first electrode of a switch transistor 610, and a third data line 530 is connected to a blue light-emitting sub-pixel 1103 and the first electrode of a switch transistor 610. The second electrode of a switch transistor 610 is coupled to a source line 20. In the case where the switch transistor 610 is turned on, a data signal on the source line 20 is transmitted to the red light-emitting sub-pixel 1101 through the first data line 510, the data signal on the source line 20 is transmitted to the green light-emitting sub-pixel 1102 through the second data line 520, and the data signal on the source line 20 is transmitted to the blue light-emitting sub-pixel 1103 through the third data line 530. It is to be noted that the embodiment of the present disclosure may be applied to both liquid crystal display panels and organic light-emitting display panels.

Figure 14:
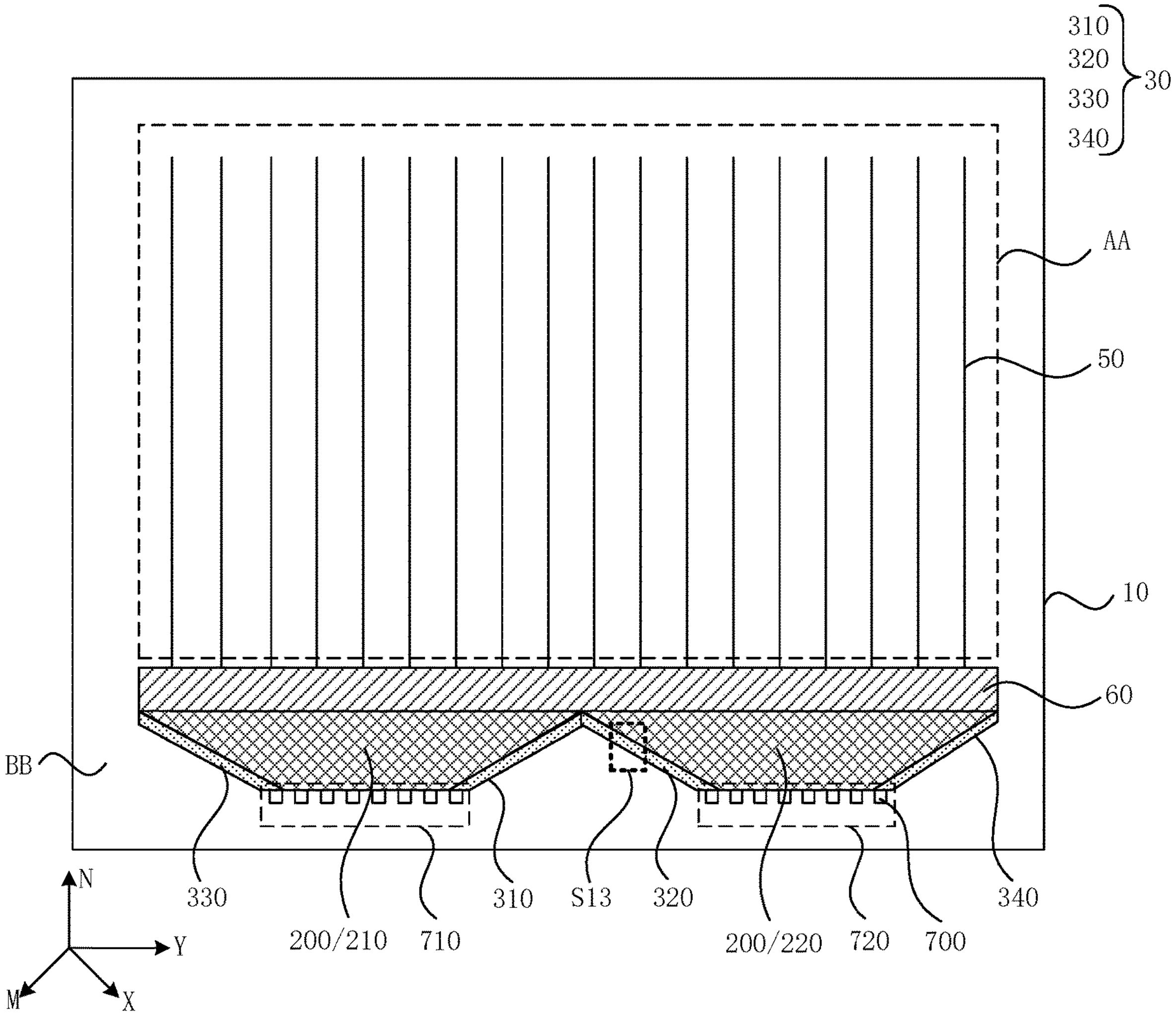
FIG. 14 is a top view of another display panel according to an embodiment of the present disclosure.
Figure 15:
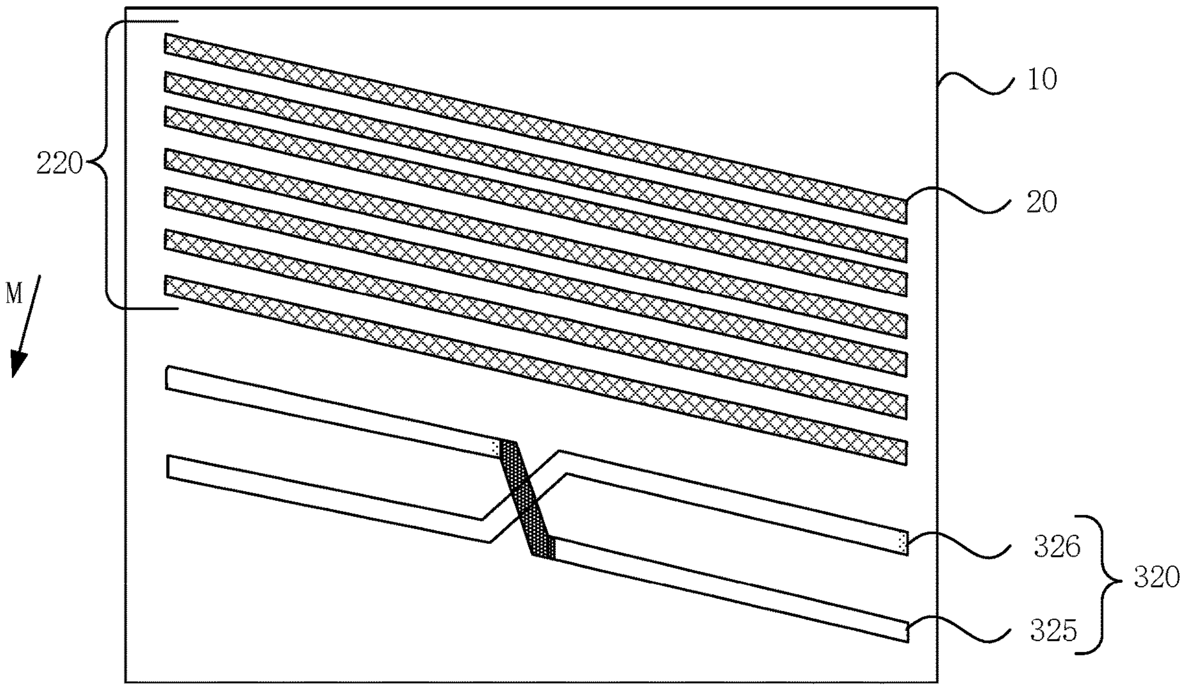
FIG. 15 is an enlarged view of region S13 in FIG. 14.

FIG. 14 is a top view of another display panel according to an embodiment of the present disclosure, and FIG. 15 is an enlarged view of region S13 in FIG. 14. Referring to FIGS. 14 and 15, multiple data lines 50 are arranged along a second direction Y, and the first direction X intersects the second direction Y. The display panel further includes the first source line group 210 and the second source line group 220. The first source line group 210 and the second source line group 220 are located on the same side of the display region AA. The first source line group 210 and the second source line group 220 are located on a side of the multiplexer circuit 60 facing away from the display region AA. The first source line group 210 and the second source line group 220 are arranged along the second direction Y. The first source line group 210 and the second source line group 220 each includes multiple source lines 20. Along the second direction Y, the first signal line group 310 is located between the first source line group 210 and the second source line group 220. In the embodiment of the present disclosure, source lines 20 in the first source line group 210 which are affected by the coupling effect are located in the middle region of the display panel along the second direction Y. These source lines 20 are affected by the coupling effect, so that voltages on the source lines 20 which are located in the middle region of the display panel along the second direction Y change relative to the preset voltage. Voltages on data lines 50 which are located in a middle region of the display region AA along the second direction Y change relative to the preset voltage. The setting in the preceding embodiments of the present disclosure is used in the first signal line group 310, so that the overall coupling effect of the first signal line group 310 on the source line 20 is reduced, the phenomenon of white vertical lines in the middle region in the display panel is reduced, and the display effect of the display panel is improved.

Exemplarily, referring to FIGS. 14 and 15, signal line groups 30 may further include a second signal line group 320. The second signal line group 320 is located on a side of the second source line group 220 along a third direction M. The third direction M is parallel to the plane where the substrate 10 is located, and the third direction M intersects the first direction X and the second direction Y. The second signal line group 320 is disposed close to the second source line group 220, and an extension direction of the second signal line group 320 is basically the same as an extension direction of source lines 20 close to the second signal line group 320 in the second source line group 220. In an exemplary embodiment, in other implementations, the extension direction of the second signal line group 320 is the same as the extension direction of the source lines 20 close to the second signal line group 320 in the second source line group 220, and the second signal line group 320 is disposed along an edge of the second source line group 220. The second signal line group 320 includes a fifth signal line 325 and a sixth signal line 326, and the fifth signal line 325 and the sixth signal line 326 transmit pulse signals which have opposite polarities. The fifth signal line 325 and the sixth signal line 326 form a double-wound line. A position relationship of various line segments in the fifth signal line 325 and the sixth signal line 326 is similar to the position relationship of various line segments in the first signal line 311 and the second signal line 312, and will not be repeated here. The embodiment of the present disclosure dose not limit the number of signal lines in the second signal line group 320.

Exemplarily, referring to FIG. 14 FIG. 15, multiple signal line groups 30 may further include a third signal line group 330. Along the second direction Y, the third signal line group 330 is located on a side of the first source line group 210 facing away from the first source line group 310. The third signal line group 330 is disposed close to the first source line group 210, and an extension direction of the third signal line group 330 is basically the same as an extension direction of source lines 20 close to the third signal line group 330 in the first source line group 210. In an exemplary embodiment, in other implementations, the extension direction of the third signal line group 330 is the same as the extension direction of the source lines 20 close to the third signal line group 300 in the first source line group 210, and the third signal line group 330 is disposed along an edge of the first source line group 210.

Exemplarily, referring to FIGS. 14 and 15, multiple signal line groups 30 may further include a fourth signal line group 340. Along the second direction Y, the fourth signal line group 340 is located on a side of the second source line group 220 facing away from the second source line group 320. The fourth signal line group 340 is disposed close to the second source line group 220, and an extension direction of the fourth signal line group 340 is basically the same as an extension direction of source lines 20 close to the fourth signal line group 340 in the second source line group 220. In an exemplary embodiment, in other implementations, the extension direction of the fourth signal line group 340 is the same as the extension direction of the source lines 20 close to the fourth signal line group 340 in the second source line group 220, and the fourth signal line group 340 is disposed along an edge of the second source line group 220.

It is to be understood that the setting manner of various signal lines in the first signal line group 310 in various embodiments of the present disclosure may be similarly applied to other signal line groups 30.

In an exemplary embodiment, referring to FIG. 14 FIG. 15, the non-display region BB includes a first bonding region 710 and a second bonding region 720. The first bonding region 710 is located on a side of the first source line group 210 facing away from the display region AA, and a bonding pad 700 of the first bonding region 710 is electrically connected to a source line 20 in the first source line group 210. The second bonding region 720 is located on a side of the second source line group 220 facing away from the display region AA, and a bonding pad 700 of the second bonding region 720 is electrically connected to a source line 20 in the second source line group 220. The first bonding region 710 and the second bonding region 720 are arranged along the second direction Y. In the first signal line group 310, the first signal line 311 and the second signal line 312 are electrically connected to different bonding pads 700 in the first bonding region 710, respectively. The first signal line 311 is electrically connected to one bonding pad 700 in the first bonding region 710, and second signal line 312 is electrically connected to another bonding pad 700 in the first bonding region 710. In the second signal line group 320, the fifth signal line 325 and the sixth signal line 326 are electrically connected to different bonding pads 700 in the second bonding region 720, respectively. The fifth signal line 325 is electrically connected to one bonding pad 700 in the second bonding region 720, and the sixth signal line 326 is electrically connected to another bonding pad 700 in the second bonding region 720. In the embodiment of the present disclosure, some data lines 50 in the display region AA are provided with data signals through bonding pads 700 in the first bonding region 710 and source lines 20 in the first source line group 210. Other data lines 50 in the display region AA are provided with data signals through bonding pads 700 in the second bonding region 720 and source lines 20 in the second source line group 220.

In an exemplary embodiment, with continued reference to FIG. 14, multiple data lines 50 are arranged along the second direction Y and extend along a fourth direction N. Any two of the first direction X, the second direction Y and the fourth direction N intersect. A length of the display region AA along the second direction Y is greater than a length of the display region AA along the fourth direction N. That is, a transverse length of the display region AA is greater than a longitudinal length of the display region AA, and the display panel is configured to display in a landscape mode. Therefore, at least two source line groups 200 are disposed in the display panel, and the first signal line group 310 may be disposed in a region between two source line groups 200, so that the phenomenon of white vertical lines in the middle region in the display panel is reduced, and the display effect of the display panel is improved. It is to be understood that the phenomenon of white vertical lines in the middle region has a greater impact on the display effect than the phenomenon of white vertical lines in an edge region and thus is more urgent to alleviate.

Figure 16:
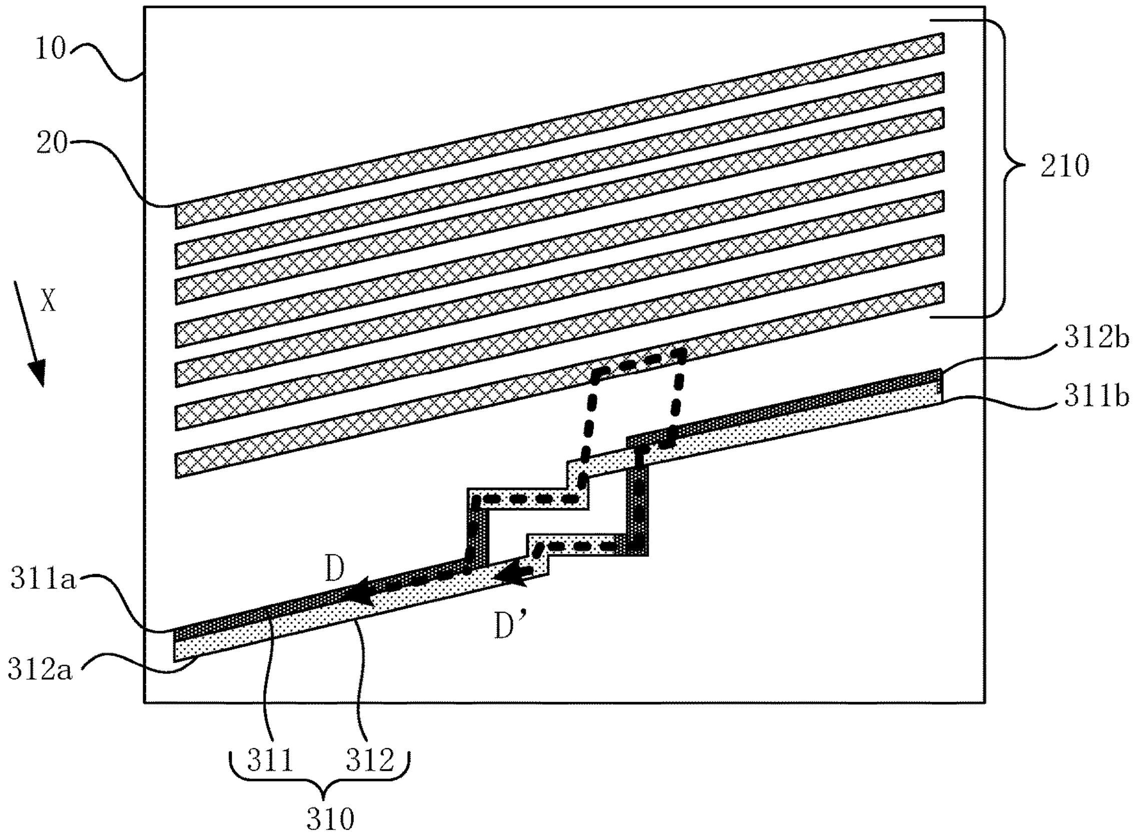
FIG. 16 is a top view of another display panel according to an embodiment of the present disclosure.
Figure 17:
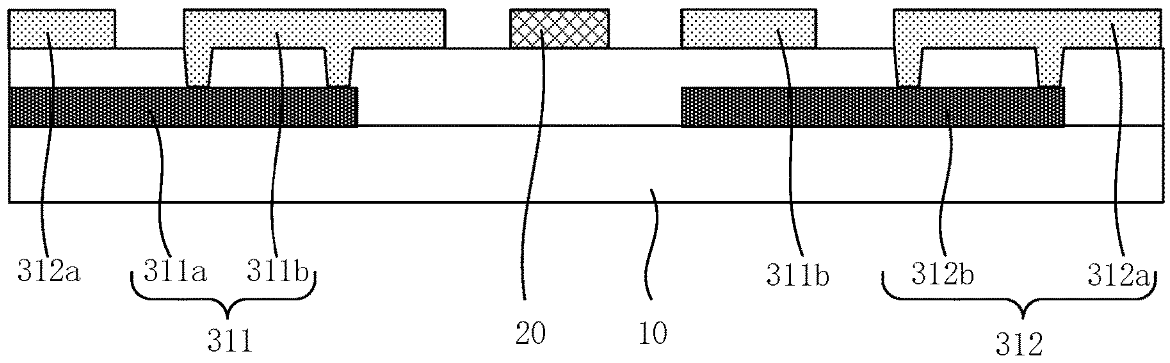
FIG. 17 is a sectional view taken along DD' in FIG. 16.

FIG. 16 is a top view of another display panel according to an embodiment of the present disclosure, and FIG. 17 is a sectional view taken along DD' in FIG. 16. Referring to FIGS. 16 and 17, along the direction perpendicular to the substrate 10, the first line segment 311*a* overlaps the third line segment 312*a* in different layers, the first line segment 311*a* and the third line segment 312*a* are located at the same distance or approximate distances from the source line 20, and the first line segment 311*a* and the third line segment 312*a* transmit pulse signals which have opposite polarities. After the coupling effect of the first line segment 311*a* and the coupling effect of the third line segment 312*a* on the source line 20 are mutually offset, the coupling effect on the source line 20 is reduced. The second line segment 311*b* overlaps the fourth line segment 312*b* in different layers. The second line segment 311*b* and the fourth line segment 312*b* transmit pulse signals which have opposite polarities. After the coupling effect of the second line segment 311*b* and the coupling effect of the fourth line segment 312*b* on the source line 20 are mutually offset, the coupling effect on the source line 20 is reduced.

Exemplarily, referring to FIGS. 16 and 17, the first line segment 311*a* and the second line segment 311*b* are in different layers, and the first line segment 311*a* is electrically connected to the second line segment 311*b* through a connecting via hole. The third line segment 312*a* and the fourth line segment 312*b* are in different layers, and the third line segment 312*a* is electrically connected to the fourth line segment 312*b* through a connecting via hole.

On the one hand, the first line segment 311*a* and the fourth line segment 312*b* are in the same layer, and the third line segment 312*a* and the second line segment 311*b* are in the same layer, so that the resistance difference between the first line segment 311*a* and the fourth line segment 312*b* is reduced, and the resistance difference between the third line segment 312*a* and the second line segment 311*b* is reduced. Therefore, the strength difference between the pulse signal transmitted by the first signal line 311 and the pulse signal transmitted by the second signal line 312 is reduced, and thus the effect of mutual offsetting between the positive coupling effect and the negative coupling effect of the first signal line 311 and the second signal line 312 on the source line 20 is improved.

On the other hand, different film layers have different coupling effects on the source line 20. The coupling effect of the third line segment 312*a* which is in the same layer as the source line 20 on the source line 20 is greater than the coupling effect of the first line segment 311*a* which is in a different layer from the source line 20 on the source line 20. The coupling effect of the second line segment 311*b* which is in the same layer as the source line 20 on the source line 20 is greater than the coupling effect of the fourth line segment 312*b* which is in a different layer from the source line 20 on the source line 20. An example where the first signal line 311 transmits a positive-polarity pulse signal and the second signal line 312 transmits a negative-polarity pulse signal is illustrated. The combined coupling effect of the first line segment 311*a* and the third line segment 312*a* on the source line 20 tends to pull down the potential on the source line 20. The combined coupling effect of the second line segment 311*b* and the fourth line segment 312*b* on the source line 20 tends to pull up the potential on the source line 20. Therefore, the combined coupling effect of the first line segment 311*a*, the second line segment 311*b*, the third line segment 312*a* and the fourth line segment 312*b* on the source line 20 tends to be "pulling up the potential on the source line 20" and "pulling down the potential on the source line 20" simultaneously. After these two coupling effects are mutually offset, the coupling effect of the first signal line group 310 on the source line 20 is reduced.

Exemplarily, referring to FIGS. 16 and 17, the first signal line 311 includes one first line segment 311*a* and one second line segment 311*b*. In other implementations, the first signal line 311 may further include multiple first line segments 311*a* and multiple second line segments 311*b*. The second signal line 312 includes one third line segment 312*a* and one fourth line segment 312*b*. In other implementations, the second signal line 312 may further include multiple third line segments 312*a* and multiple fourth line segments 312*b*.

Exemplarily, referring to FIGS. 16 and 17, the length of one first line segment 311*a* is equal to the length of one fourth line segment 312*b*, and the length of one second line segment 311*b* is equal to the length of one third line segment 312*a*.

In an implementation, the first line segment 311*a* and the fourth line segment 312*b* are set collinearly. The source line 20 closest to the first signal line group 310 is parallel to the first line segment 311*a*. The extension direction of the source line 20 closest to the first signal line group 310 is perpendicular to the first direction X. The first line segment 311*a* and the fourth line segment 312*b* are located at the same distance from the source line 20; after the coupling effect of the first line segment 311*a* and the coupling effect of the fourth line segment 312*b* on the source line 20 are mutually offset, the coupling effect on the source line 20 is reduced. The third line segment 312*a* and the second line segment 311*b* are set collinearly. The source line 20 closest to the first signal line group 310 is parallel to the third line segment 312*a*. The third line segment 312*a* and the second line segment 311*b* are located at the same distance from the source line 20; after the coupling effect of the third line segment 312*a* and the coupling effect of the second line segment 311*b* on the source line 20 are mutually offset, the coupling effect on the source line 20 is reduced. In the embodiment of the present disclosure, not only the positive coupling effect (pulling up the potential) and the negative coupling effect (pulling down the potential) on the source line 20 are balanced along the direction perpendicular to the first direction X, but also the positive coupling effect (pulling up the potential) and the negative coupling effect (pulling down the potential) on the source line 20 are balanced along the first direction X.

In other implementations, the third line segment 312*a* and the second line segment 311*b* may not be collinear.

Figure 18:
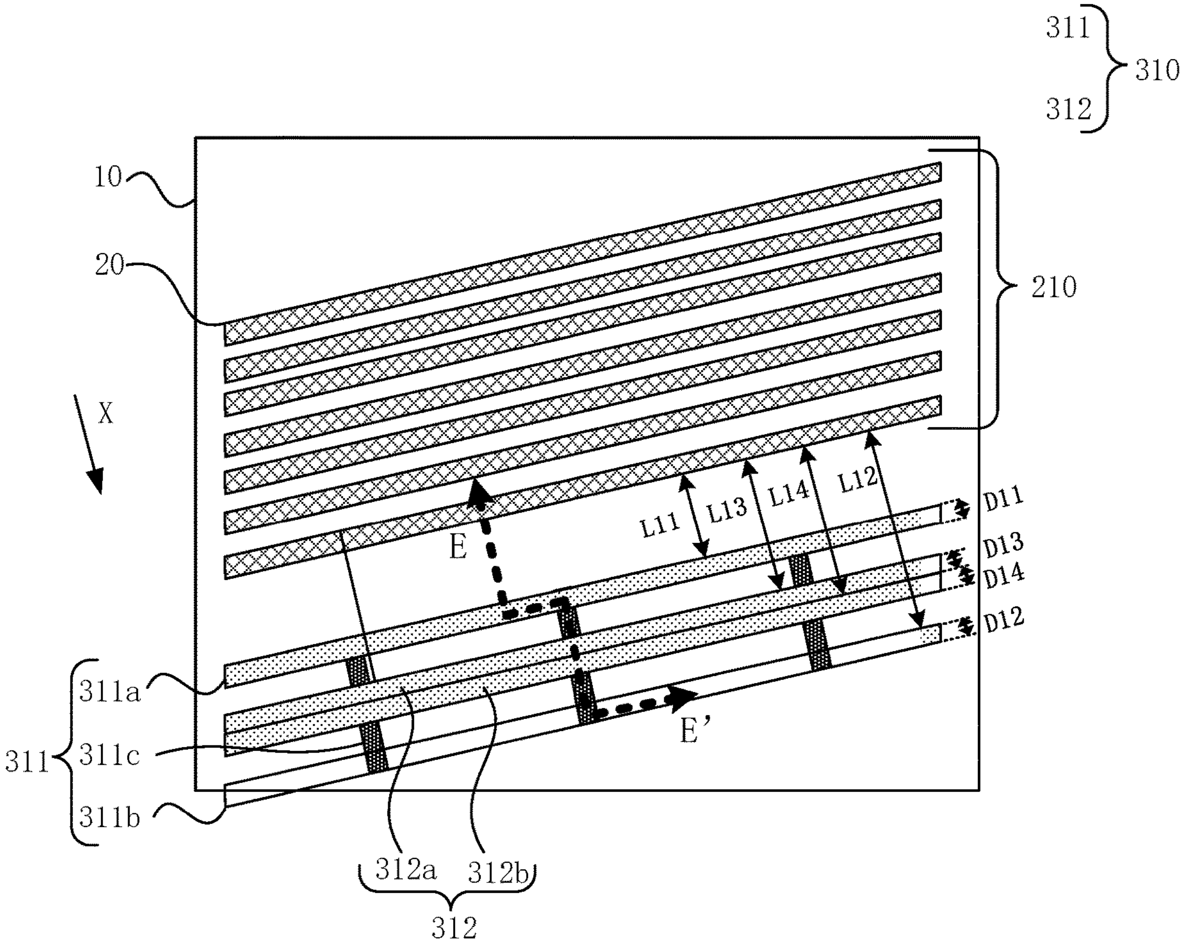
FIG. 18 is a top view of another display panel according to an embodiment of the present disclosure.
Figure 19:
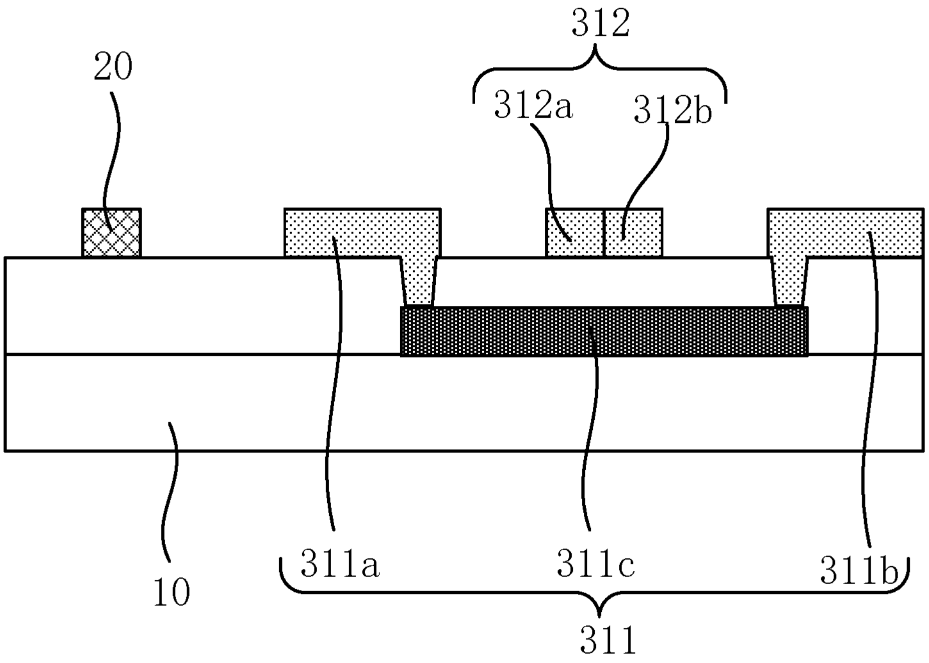
FIG. 19 is a sectional view taken along EE' in FIG. 18.

FIG. 18 is a top view of another display panel according to an embodiment of the present disclosure, and FIG. 19 is a sectional view taken along EE' in FIG. 18. Referring to FIGS. 18 and 19, the first line segment 311*a*, the third line segment 312*a*, the fourth line segment 312*b* and the second line segment 311*b* are arranged in sequence along the first direction X and away from the source line 20. Along the first direction X, the third line segment 312*a* is located between the first line segment 311*a* and the second line segment 311*b*. The third line segment 312*b* is located between the first line segment 311*a* and the second line segment 311*b*.

An example where the first signal line 311 transmits a positive-polarity pulse signal and the second signal line 312 transmits a negative-polarity pulse signal is illustrated. The combined coupling effect of the first line segment 311*a* and the third line segment 312*a* on the source line 20 tends to pull up the potential on the source line 20. The combined coupling effect of the fourth line segment 312*b* and the second line segment 311*b* on the source line 20 tends to pull down the potential on the source line 20. Therefore, the combined coupling effect of the first line segment 311*a*, the second line segment 311*b*, the third line segment 312*a* and the fourth line segment 312*b* on the source line 20 tends to be "pulling up the potential on the source line 20" and "pulling down the potential on the source line 20" simultaneously. After these two coupling effects are mutually offset, the coupling effect of the first signal line group 310 on the source line 20 is reduced.

In an exemplary embodiment, referring to FIGS. 18 and 19, the first signal line 311 further includes the first connecting line segment 311*c*, and the first connecting line segment 311*c* connects the first line segment 311*a* and the second line segment 311*b*. Along the direction perpendicular to the plane where the substrate 10 is located, the first connecting line segment 311*c* overlaps the third line segment 312*a* in different layers, and the first connecting line segment 311*c* overlaps the fourth line segment 312*b* in different layers. The first connecting line segment 311*c* and the third line segment 312*a* form overlap capacitance, and the first connecting line segment 311*c* and the fourth line segment 312*b* form overlap capacitance, so that the coupling effects of the first signal line 311 and the second signal line 312 on the source line 20 are reduced.

Exemplarily, referring to FIGS. 18 and 19, one first line segment 311*a* and one second line segment 311*b* are electrically connected through multiple first connecting line segments 311*c*. Along the direction perpendicular to the plane where the substrate 10 is located, multiple first connecting line segments 311*c* overlap the same third line segment 312*a* in different layers, and multiple first connecting line segments 311*c* overlap the same fourth line segment 312*b* in different layers. In the embodiment of the present disclosure, multiple first connecting line segments 311*c* are disposed, so that multiple first connecting line segments 311*c* and the third line segment 312*a* form multiple pieces of overlap capacitance. Multiple first connecting line segments 311*c* and the fourth line segment 312*b* form multiple pieces of overlap capacitance. Therefore, the capacitance value is increased, and the coupling effects of the first signal line 311 and the second signal line 312 on the source line 20 are reduced.

Exemplarily, referring to FIGS. 18 and 19, the first line segment 311*a*, the second line segment 311*b*, the third line segment 312*a* and the fourth line segment 312*b* are disposed in the same layer. The third line segment 312*a* and the fourth line segment 312*b* are electrically connected in the same layer. The first connecting line segment 311*c* and the first line segment 311*a* are in different layers, and the first connecting line segment 311*c* and the first line segment 311*a* are electrically connected through a connecting via hole. The first connecting line segment 311*c* and the second line segment 311*b* are in different layers, and the first connecting line segment 311*c* and the second line segment 311*b* are electrically connected through a connecting via hole.

In an exemplary embodiment, referring to FIG. 18, along the first direction X, the distance between the first line segment 311*a* and the source line 20 is L11, the distance between the second line segment 311*b* and the source line 20 is L12, the distance between the third line segment 312*a* and the source line 20 is L13, and a distance between the fourth line segment 312*b* and the source line 20 is L14. Along the first direction X, a line width of the first line segment 311*a* is D11, a line width of the second line segment 311*b* is D12, a line width of the third line segment 312*a* is D13, and a line width of the fourth line segment 312*b* is D14. It is denoted that K1=L11×D11+L12×D12 and K2=L13×D13+L14×D14 and it is satisfied that $$\frac{K1}{K2}$$

is greater than 0.7 and less than 1.3. In the embodiment of the present disclosure, a sum of the coupling effect of the first line segment 311*a* on the source line 20 and the coupling effect of the second line segment 311*b* on the source line 20 is approximately equal to a sum of the coupling effect of the third line segment 312*a* on the source line 20 and the coupling effect of the fourth segment 312*b* on the source line 20. If $$\frac{K1}{K2}$$

is less than 0.7, the sum of the coupling effect of the first line segment 311*a* on the source line 20 and the coupling effect of the second line segment 311*b* on the source line 20 will be much less than the sum of the coupling effect of the third line segment 312*a* on the source line 20 and the coupling effect of the fourth line segment 312*b* on the source line 20; as a result, after the coupling effects are mutually offset, the coupling effect of the second signal line 312 on the source line 20 is relatively great. If $$\frac{K1}{K2}$$

is greater than 1.3, the sum of the coupling effect of the first line segment 311*a* on the source line 20 and the coupling effect of the second line segment 311*b* on the source line 20 will be much greater than the sum of the coupling effect of the third line segment 312*a* on the source line 20 and the coupling effect of the fourth line segment 312*b* on the source line 20; as a result, after the coupling effects are mutually offset, the coupling effect of the first signal line 311 on the source line is relatively great. Therefore, it is set that $$\frac{K1}{K2}$$

is greater than 0.7 and less than 1.3, so that the coupling effect of the first signal line 311 on the source line 20 is similar to the coupling effect of the second signal line 312 on the source line 20, and thus the combined coupling effect of the first signal line 311 and the second signal line 312 on the source line 20 is reduced.

In an implementation, D11=D12=D13=D14. In this manner, the difficulty of preparing the first signal line 311 and the second signal line 312 is reduced. Moreover, it may be set that K1=K2 so that the combined coupling effect of the first signal line 311 and the second signal line 312 on the source line 20 is further reduced.

It is to be noted that the preceding formula that $$\frac{K1}{K2}$$

is greater than 0.7 and less than 1.3 is suitable for preceding various implementations of the present disclosure, and for example, is also suitable for implementations shown in FIG. 2 and FIG. 16.

Figure 20:
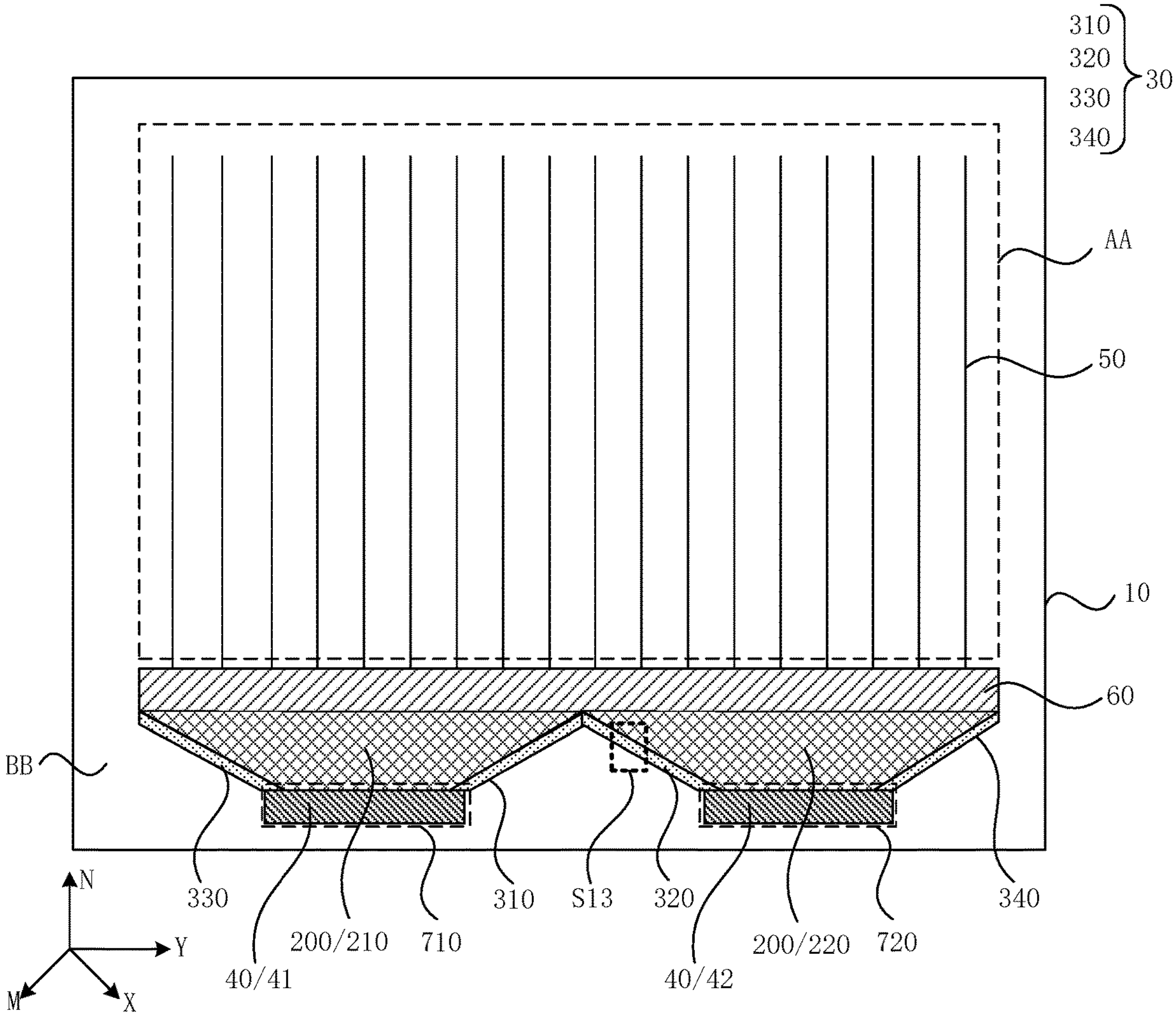
FIG. 20 is a structural view of a display device according to an embodiment of the present disclosure.

An embodiment of the present disclosure further provides a display device. FIG. 20 is a structural view of a display device according to an embodiment of the present disclosure. Referring to FIG. 20, the display device includes the display panel according to any embodiment of the present disclosure. Therefore, the display device provided in the embodiment of the present disclosure has the corresponding beneficial effects of the display panel. The details are not repeated here. For example, the display device may be an electronic device such as a mobile phone, a computer, a smart wearable device (for example, a smart watch) and an in-vehicle display device, which is not limited in the embodiment of the present disclosure.

Exemplarily, referring to FIGS. 14 and 20, the display device further includes at least one driver chip 40, and the driver chip 40 is in bonding electrical connection with a bonding pad 700, and then provides data signals for display source lines 20, and provides electrical signals for signal lines (including the first signal line 311 and the second signal line 312) of the signal line group 30. The electrical signals may be, for example, clock control signals.

Exemplarily, referring to FIGS. 14 and 20, the display device further includes two driver circuits 40, and the two driver circuits 40 are a first driver circuit 41 and a second driver circuit 42, respectively. The first driver chip 41 is in bonding electrical connection with the bonding pad 700 in the first bonding region 710, and the second driver chip 42 is in bonding electrical connection with the bonding pad 700 in the second bonding region 720.

Exemplarily, referring to FIGS. 14 and 20, the first driver circuit 41 is located in the first bonding region 710, and the second driver circuit 42 is located in the second bonding region 720. The driver circuit 40 is directly bonded to the bonding pad 700 of the display panel. In other implementations, the driver chip 40 may also be located on a flexible circuit board, the flexible circuit board is bound to the bonding pad 700 of the display panel, and the driver chip 40 is electrically connected to the bonding pad 700 through the flexible circuit board.

It is to be noted that the preceding are only preferred embodiments of the present disclosure and technical principles used therein. It is to be understood by those skilled in the art that the present disclosure is not limited to the embodiments described herein. For those skilled in the art, various apparent changes, readjustments, and substitutions can be made without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A display panel, comprising a display region and a non-display region, wherein the non-display region is located on a periphery of the display region;

wherein the display panel comprises:

a substrate;

a source line, wherein the source line is located in the non-display region; and a signal line group, wherein the signal line group is located in the non-display region and is located on a same side of the substrate as the source line, the signal line group comprises a first signal line group, the first signal line group is located on a side of the source line along a first direction, wherein the first direction is parallel to a plane where the substrate is located; the first signal line group comprises a first signal line and a second signal line, and the first signal line and the second signal line transmit pulse signals which have opposite polarities;

wherein the first signal line comprises a first line segment and a second line segment which are coupled, and the second signal line comprises a third line segment and a fourth line segment which are coupled;

along the first direction, a distance between the first line segment and the source line is less than or equal to a distance between the third line segment and the source line; and along the first direction, a distance between the second line segment and the source line is greater than or equal to a distance between the fourth line segment and the source line;

wherein the first signal line group further comprises a third signal line and a fourth signal line; the third signal line and the fourth signal line transmit pulse signals which have opposite polarities, and the third signal line and the first signal line transmit pulse signals which have a same polarity: the third signal line comprises a fifth line segment and a sixth line segment which are coupled, and the fourth signal line comprises a seventh line segment and an eighth line segment which are coupled;

wherein the display panel further satisfies one of the following:

along the first direction, the fifth line segment is located between the first line segment and the third line segment, and the seventh line segment is located on a side of the third line segment facing away from the first line segment; and along the first direction, the eighth line segment is located between the fourth line segment and the second line segment, and the sixth line segment is located on a side of the second line segment facing away from the fourth line segment; or along the first direction, the seventh line segment is located on a side of the third line segment facing away from the first line segment, and the fifth line segment is located on a side of the seventh line segment facing away from the third line segment; and along the first direction, the sixth line segment is located on a side of the second line segment facing away from the fourth line segment, and the eighth line segment is located on a side of the sixth line segment facing away from the second line segment.

2. The display panel according to claim 1, wherein the first signal line further comprises a first connecting line segment, and the first connecting line segment connects the first line segment and the second line segment; and the second signal line further comprises a second connecting line segment, the second connecting line segment connects the third line segment and the fourth line segment, and along a direction perpendicular to the plane where the substrate is located, the second connecting line segment overlaps the first connecting line segment in different layers.

3. The display panel according to claim 2, wherein the first line segment, the second line segment, the third line segment, the fourth line segment and the first connecting line segment are in a same layer.

4. The display panel according to claim 2, wherein the first line segment has a same length as the fourth line segment, and the second line segment has a same length as the third line segment.

5. The display panel according to claim 2, wherein the first signal line comprises one first line segment and one second line segment, and the second signal line comprises one third line segment and one fourth line segment.

6. The display panel according to claim 2, wherein the first signal line comprises a plurality of first line segments and a plurality of second line segments, and the plurality of first line segments and the plurality of second line segments are arranged alternately; and the second signal line comprises a plurality of third line segments and a plurality of fourth line segments, and the plurality of third line segments and the plurality of fourth line segments are arranged alternately.

7. The display panel according to claim 6, wherein the first signal line further comprises a third connecting line segment, and a first line segment of the plurality of first line segments and a second line segment of the plurality of second line segments are connected through the first connecting line segment or the third connecting line segment;

the second signal line further comprises a fourth connecting line segment, and a third line segment of the plurality of third line segments and a fourth line segment of the plurality of fourth line segments are connected through the second connecting line segment or the fourth connecting line segment; and the first connecting line segment and the fourth connecting line segment are in a same layer, the third connecting line segment and the second connecting line segment are in a same layer, and along the direction perpendicular to the plane where the substrate is located, the third connecting line segment overlaps the fourth connecting line segment in different layers.

8. The display panel according to claim 1, further comprising:

a data line, wherein at least part of the data line is located in the display region, and the data line is coupled to the source line.

9. The display panel according to claim 8, further comprising:

a multiplexer circuit, wherein the multiplexer circuit is located in the non-display region and comprises a switch transistor;

wherein a first electrode of the switch transistor is coupled to the data line, a second electrode of the switch transistor is coupled to the source line, and a gate of the switch transistor is coupled to the first signal line or the second signal line.

10. The display panel according to claim 9, wherein the switch transistor comprises a first switch sub-transistor and a second switch sub-transistor, a first electrode of the first switch sub-transistor is electrically connected to a first electrode of the second switch sub-transistor, and a second electrode of the first switch sub-transistor is electrically connected to a second electrode of the second switch sub-transistor; and a gate of the first switch sub-transistor is coupled to the first signal line, and a gate of the second switch sub-transistor is coupled to the second signal line.

11. The display panel according to claim 8, wherein a plurality of data lines are arranged along a second direction, and the first direction intersects the second direction;

the display panel further comprises a first source line group and a second source line group, wherein the first source line group and the second source line group are located on a same side of the display region, the first source line group and the second source line group are arranged along the second direction, and each of the first source line group and the second source line group comprises a plurality of source lines; and along the second direction, the first signal line group is located between the first source line group and the second source line group.

12. The display panel according to claim 11, wherein the non-display region comprises a first bonding region and a second bonding region;

the first bonding region is located on a side of the first source line group facing away from the display region, and a bonding pad of the first bonding region is electrically connected to a source line in the first source line group; the second bonding region is located on a side of the second source line group facing away from the display region, and a bonding pad of the second bonding region is electrically connected to a source line in the second source line group;

in the first signal line group, the first signal line and the second signal line are electrically connected to different bonding pads in the first bonding region, respectively;

the signal line groups further comprise a second signal line group, and the second signal line group is located on a side of the second source line group along a third direction, wherein the third direction is parallel to the plane where the substrate is located and intersects the first direction and the second direction; the second signal line group comprises a fifth signal line and a sixth signal line, and the fifth signal line and the sixth signal line transmit pulse signals which have opposite polarities; and in the second signal line group, the fifth signal line and the sixth signal line are electrically connected to different bonding pads in the second bonding region, respectively.

13. The display panel according to claim 8, wherein a plurality of data lines are arranged along a second direction and extend along a fourth direction, and any two of the first direction, the second direction and the fourth direction intersect; and a length of the display region along the second direction is greater than a length of the display region along the fourth direction.

14. The display panel according to claim 1, wherein along a direction perpendicular to the plane where the substrate is located, the first line segment overlaps the third line segment in different layers, and the second line segment overlaps the fourth line segment in different layers.

15. The display panel according to claim 14, wherein the first line segment is electrically connected to the second line segment in different layers and is in a same layer as the fourth line segment; and the third line segment is electrically connected to the fourth line segment in different layers and is in a same layer as the second line segment.

16. The display panel according to claim 1, wherein the first line segment, the third line segment, the fourth line segment and the second line segment are arranged in sequence along the first direction and facing away from the source line.

17. The display panel according to claim 16, wherein the first signal line further comprises a first connecting line segment, and the first connecting line segment connects the first line segment and the second line segment; and along a direction perpendicular to the plane where the substrate is located, the first connecting line segment overlaps the third line segment in different layers and overlaps the fourth line segment in different layers.

18. The display panel according to claim 1, wherein along the first direction, a distance between the first line segment and the source line is L11, a distance between the second line segment and the source line is L12, a distance between the third line segment and the source line is L13, and a distance between the fourth line segment and the source line is L14;

a line width of the first line segment is D11, a line width of the second line segment is D12, a line width of the third line segment is D13, and a line width of the fourth line segment is D14; and it is denoted that $K1=L11\times D11+L12\times D12$ and $K2=L13\times D13+L14\times D14$ and it is satisfied that $$\frac{K1}{K2}$$

is greater than 0.7 and less than 1.3.

19. A display device, comprising a display panel, wherein the display panel comprises a display region and a non-display region, wherein the non-display region is located on a periphery of the display region;

wherein the display panel comprises:

a substrate;

a source line, wherein the source line is located in the non-display region; and a signal line group, wherein the signal line group is located in the non-display region and is located on a same side of the substrate as the source line, the signal line group comprises a first signal line group, the first signal line group is located on a side of the source line along a first direction, wherein the first direction is parallel to a plane where the substrate is located; the first signal line group comprises a first signal line and a second signal line, and the first signal line and the second signal line transmit pulse signals which have opposite polarities;

wherein the first signal line comprises a first line segment and a second line segment which are coupled, and the second signal line comprises a third line segment and a fourth line segment which are coupled;

along the first direction, a distance between the first line segment and the source line is less than or equal to a distance between the third line segment and the source line; and along the first direction, a distance between the second line segment and the source line is greater than or equal to a distance between the fourth line segment and the source line;

wherein the first signal line group further comprises a third signal line and a fourth signal line; the third signal line and the fourth signal line transmit pulse signals which have opposite polarities, and the third signal line and the first signal line transmit pulse signals which have a same polarity; the third signal line comprises a fifth line segment and a sixth line segment which are coupled, and the fourth signal line comprises a seventh line segment and an eighth line segment which are coupled;

wherein the display panel further satisfies one of the following:

along the first direction, the fifth line segment is located between the first line segment and the third line segment, and the seventh line segment is located on a side of the third line segment facing away from the first line segment; and along the first direction, the eighth line segment is located between the fourth line segment and the second line segment, and the sixth line segment is located on a side of the second line segment facing away from the fourth line segment; or along the first direction, the seventh line segment is located on a side of the third line segment facing away from the first line segment, and the fifth line segment is located on a side of the seventh line segment facing away from the third line segment; and along the first direction, the sixth line segment is located on a side of the second line segment facing away from the fourth line segment, and the eighth line segment is located on a side of the sixth line segment facing away from the second line segment.

* * * * *